(12) United States Patent
Nagumo et al.

(10) Patent No.: US 12,206,867 B2
(45) Date of Patent: Jan. 21, 2025

(54) INFORMATION PROCESSING DEVICE AND METHOD

(71) Applicant: SONY SEMICONDUCTOR SOLUTIONS CORPORATION, Kanagawa (JP)

(72) Inventors: Takefumi Nagumo, Kanagawa (JP); Takuya Kitamura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 144 days.

(21) Appl. No.: 17/904,137

(22) PCT Filed: Feb. 8, 2021

(86) PCT No.: PCT/JP2021/004515
§ 371 (c)(1),
(2) Date: Aug. 12, 2022

(87) PCT Pub. No.: WO2021/166707
PCT Pub. Date: Aug. 26, 2021

(65) Prior Publication Data
US 2023/0066438 A1   Mar. 2, 2023

(30) Foreign Application Priority Data
Feb. 21, 2020   (JP) ................. 2020-028089

(51) Int. Cl.
*H04N 19/184*   (2014.01)
*H04N 19/124*   (2014.01)
*H04N 19/166*   (2014.01)

(52) U.S. Cl.
CPC ......... *H04N 19/184* (2014.11); *H04N 19/124* (2014.11); *H04N 19/166* (2014.11)

(58) Field of Classification Search
CPC ............... H04N 19/124; H04N 19/166; H04N 19/184; H04N 19/115; H04N 19/147; H04N 19/172; H04N 19/85
(Continued)

(56) References Cited

U.S. PATENT DOCUMENTS

2008/0089616 A1 *   4/2008   Gwak ................. H04N 5/2621
                                                             348/E5.042
2014/0285626 A1     9/2014   Fu et al.
(Continued)

FOREIGN PATENT DOCUMENTS

WO   WO-2005116927 A1 * 12/2005 ........... H04N 19/105
WO      2013/028121 A1    2/2013
WO   WO-2019124248 A1 *  6/2019 ........... H04N 13/161

OTHER PUBLICATIONS

International Search Report and Written Opinion of PCT Application No. PCT/JP2021/004515, issued on Apr. 27, 2021, 10 pages of ISRWO.
(Continued)

*Primary Examiner* — Behrooz M Senfi
(74) *Attorney, Agent, or Firm* — CHIP LAW GROUP

(57) ABSTRACT

There is provided an information processing device and method capable of suppressing an increase in load of processing of sensing data. A bit depth of intermediate data generated from sensing data obtained in a sensor of an indirect time-of-flight (TOF) system is corrected, and the intermediate data with the bit depth corrected is encoded, and coded data is generated. For example, the bit depth of the intermediate data is corrected using a gamma curve that is a predetermined curve indicating input-output characteristics. The present disclosure can be applied to, for example, an image processing device, an image encoding device, an image decoding device, an imaging element, an imaging device, or the like.

14 Claims, 31 Drawing Sheets

(58) Field of Classification Search
USPC .................................................. 375/240.03
See application file for complete search history.

(56) References Cited

U.S. PATENT DOCUMENTS

2020/0404238 A1* 12/2020 Nakata .................. H04N 19/17
2021/0383508 A1* 12/2021 Hagiwara ................ G06T 5/50

OTHER PUBLICATIONS

Hutchings, et al., "A Reconfigurable 3-D-Stacked SPAD Imager With In-Pixel Histogramming for Flash LIDAR or High-Speed Time-of-Flight Imaging", IEEE, Journal of Solid-State Circuits, vol. 54, No. 11, Nov. 2019, pp. 2947-2956.
Yasutomi, et al., "Technical explanation Time-of-Flight camera", Journal of the Institute of Image Information and Television Engineers, vol. 70, No. 11, Aug. 29, 2016, pp. 880-885.

* cited by examiner

INFORMATION PROCESSING DEVICE AND METHOD

CROSS REFERENCE TO RELATED APPLICATIONS

This application is a U.S. National Phase of International Patent Application No. PCT/JP2021/004515 filed on Feb. 8, 2021, which claims priority benefit of Japanese Patent Application No. JP 2020-028089 filed in the Japan Patent Office on Feb. 21, 2020. Each of the above-referenced applications is hereby incorporated herein by reference in its entirety.

TECHNICAL FIELD

The present disclosure relates to an information processing device and a method, and particularly relates to an information processing device and a method capable of suppressing an increase in load of processing of sensing data.

BACKGROUND ART

Conventionally, a method has been considered in which, when imaging a subject, a distance to the subject is measured to generate depth data, and the depth data is used together with an imaged image (see, for example, Non-Patent Document 1).

CITATION LIST

Non-Patent Document

Non-Patent Document 1: Keita Yasutomi and Shoji Kawahito, "Technical explanation Time-of-Flight camera", Journal of the Institute of Image Information and Television Engineers, 2016, vol. 70, No. 11, pp. 880 to 885, received on Aug. 29, 2016

SUMMARY OF THE INVENTION

Problems to be Solved by the Invention

However, unlike image data for viewing that humans enjoy viewing, data for sensing often requires a large dynamic range, and a data format with a large bit depth is often used to represent data. Due to this large bit depth, there is a possibility that the amount of memory, transmission cost, calculation cost, or the like increases due to transmission of the data for sensing, noise reduction processing, or the like.

The present disclosure has been made in view of such a situation, and is intended to make it possible to suppress an increase in load of processing of sensing data.

Solutions to Problems

An information processing device according to one aspect of the present technology is an image processing device including a bit depth correcting section that corrects a bit depth of intermediate data generated from sensing data obtained in a sensor of an indirect time-of-flight (TOF) method, and an encoding section that encodes the intermediate data with the bit depth corrected and generates coded data.

An information processing method according to one aspect of the present technology is an image processing method including correcting a bit depth of intermediate data generated from sensing data obtained in a sensor of an indirect time-of-flight (TOF) method, and encoding the intermediate data with the corrected bit depth and generating coded data.

In the information processing device and the method according to one aspect of the present technology, a bit depth of intermediate data generated from sensing data obtained in a sensor of an indirect time-of-flight (TOF) method is corrected, and the intermediate data with the bit depth corrected is encoded and coded data is generated.

MODE FOR CARRYING OUT THE INVENTION

Hereinafter, modes for carrying out the present disclosure (hereinafter referred to as embodiments) will be described. Note that the description will be made in the following order.

1. ToF
2. First Embodiment (Distance Measuring Device)
3. Second Embodiment (Distance Measuring Device)
4. Third Embodiment (Distance Measuring System)
5. Fourth Embodiment (Distance Measuring Device)
6. Computer
7. Application Example to Mobile Body
8. Application target of present technology
9. Others

1. TOF

Conventionally, for example, as described in Non-Patent Document 1, a method has been considered in which a distance to the subject is measured to generate depth data, and the depth data is used together with an imaged image. Then, various methods have been proposed as the distance measurement method.

Figure 1:
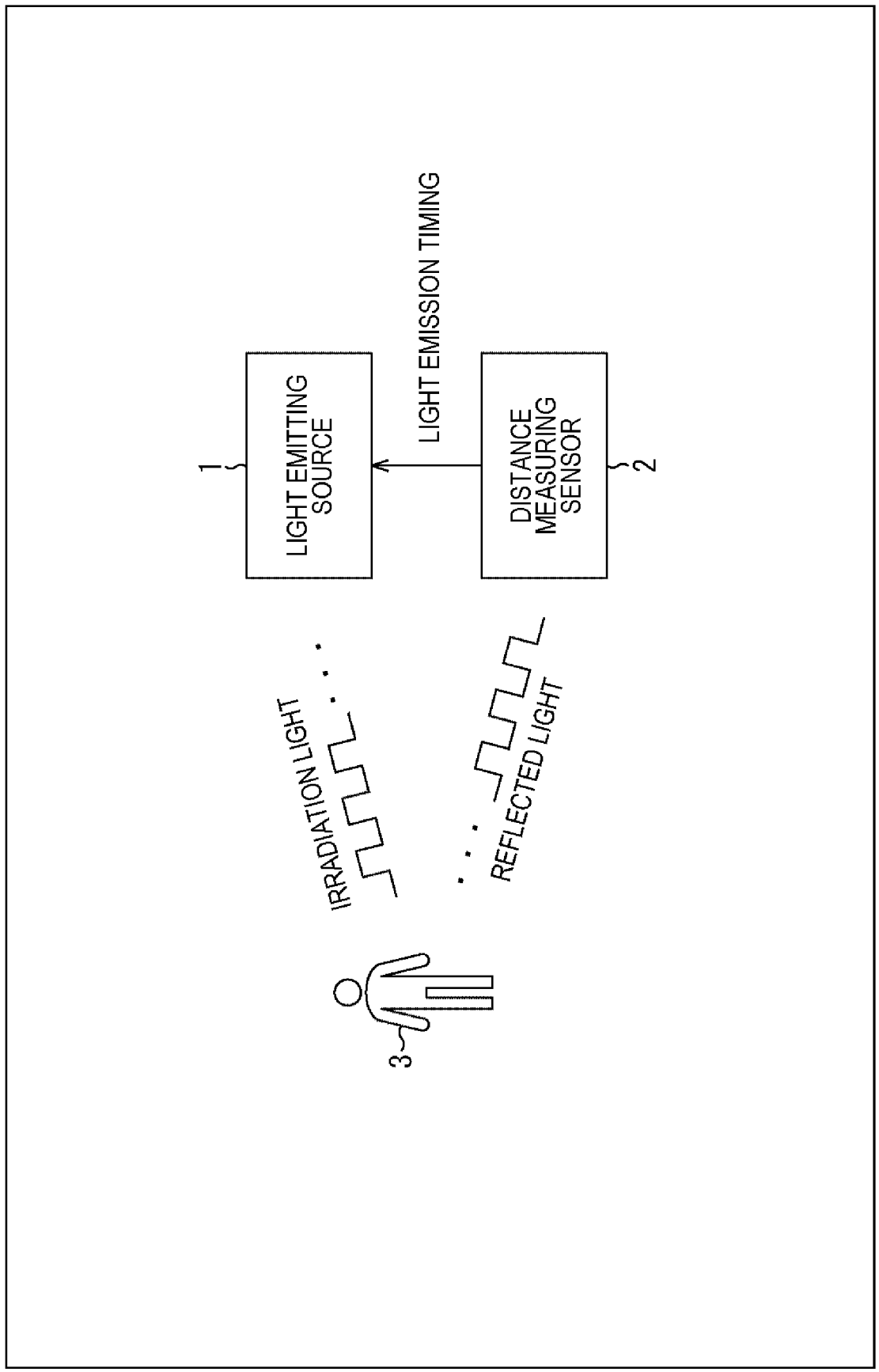
FIG. 1 is a diagram depicting an example of a state of distance measurement by an indirect ToF method.

For example, as depicted in FIG. 1, there has been considered Time-of-Flight (ToF) in which light is emitted from a light emitting source 1 toward a subject 3, the time until reflected light thereof is received by a distance measuring sensor 2 is measured, and the distance to the subject 3 is derived on the basis of the time. Furthermore, as the ToF method, a direct ToF method and an indirect ToF method have been considered.

In a case of the direct ToF method, a TDC (Time-to-Digital Converter) is used, and thus it is difficult to increase the number of pixels. In a case of the indirect ToF method, a time calculation circuit such as the TDC is unnecessary in the pixel, and an increase in the number of elements in the pixel can be suppressed. Therefore, the number of pixels can be easily increased.

In the case of the indirect ToF method, a photoelectric charge generated in a photodiode is modulated by a lock-in pixel using a time window (clock) synchronized with the light source. At this time, time information is reflected in a signal amount, so that the flight time can be derived.

Figure 2:
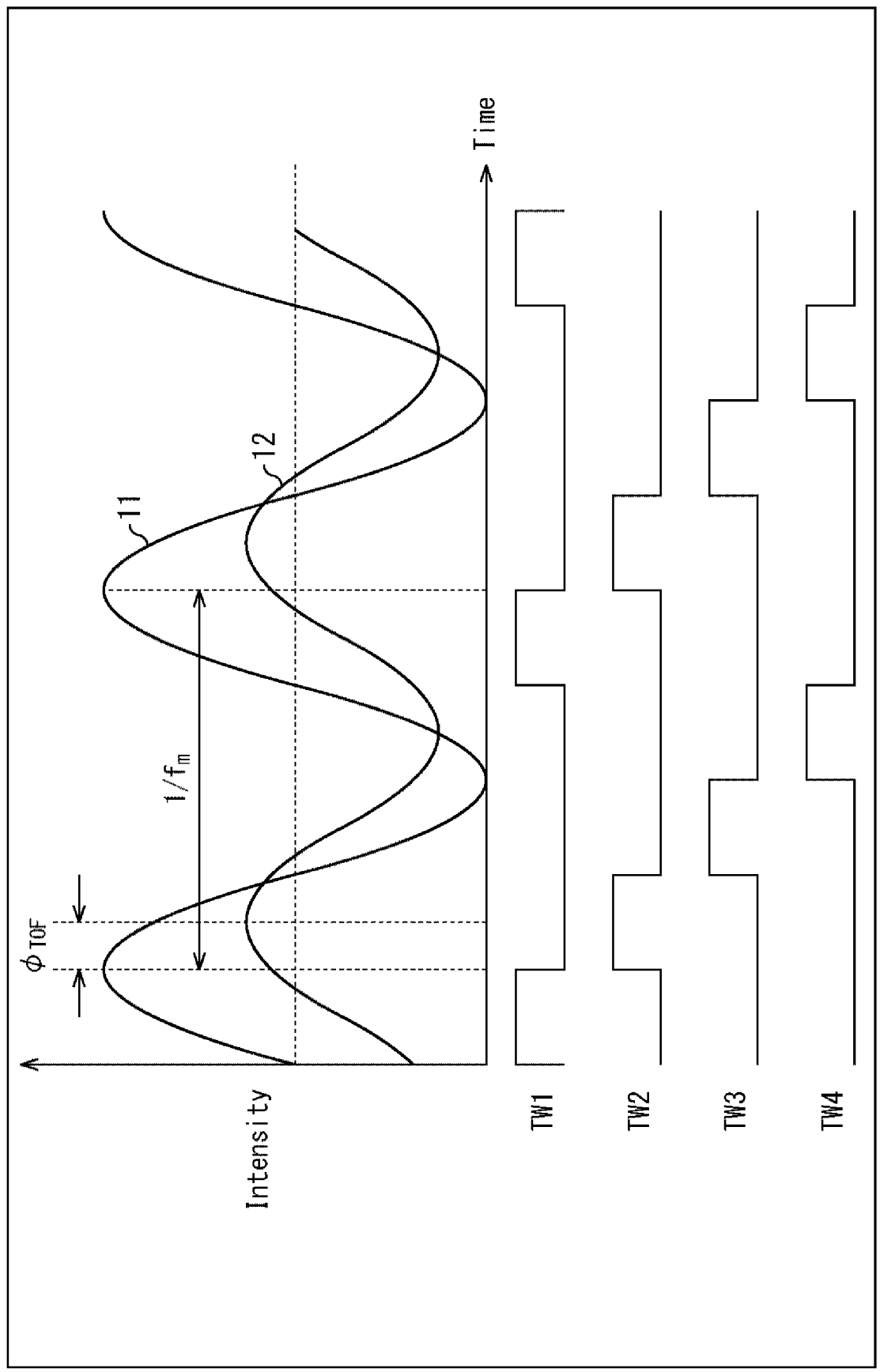
FIG. 2 is a diagram depicting an example of a state of distance measurement by the indirect ToF method.

Examples of a modulation method used in the indirect ToF method include continuous wave modulation and pulse wave modulation. An example of a state of the continuous wave modulation is depicted in FIG. 2. In the graph depicted in FIG. 2, a sine wave 11 indicates emitted light (Emitted), and a sine wave 12 indicates reflected light (Received). As depicted in FIG. 2, in a case of the continuous wave modulation, a phase difference between the emitted light and the reflected light can be derived by performing lock-in detection using four time windows. The lock-in detection used here refers to an operation of accumulating signals of the same phase a plurality of times by a short electronic shutter synchronized with the light source. In a case of modulation with a sine wave, the phase difference $\varphi_{TOF}$ is derived as in the following Expression (1) using the signals $A_0, A_1, A_2$, and $A_3$ accumulated in four time windows TW1, TW2, TW3, and TW4.

[Expression 1]

$$\phi_{TOF} = \frac{1}{2\pi f_m} \tan^{-1}\left(\frac{A_3 - A_1}{A_2 - A_0}\right) \qquad (1)$$

A modulation frequency $f_m$ is known, and thus a phase ($\varphi_{TOF}$) can be converted into time ($t_{TOF}$) using the following Expression (2).

[Expression 2]

$$t_{TOF} = \frac{\phi_{TOF}}{2\pi f_m} \qquad (2)$$

Note that the received light includes a DC component other than the light source, that is, a background light component, but the background light component is canceled by the calculation of Expression (1) described above. Therefore, in a range where the sensor is not saturated, the distance can be estimated without being affected by the background light.

Figure 3:
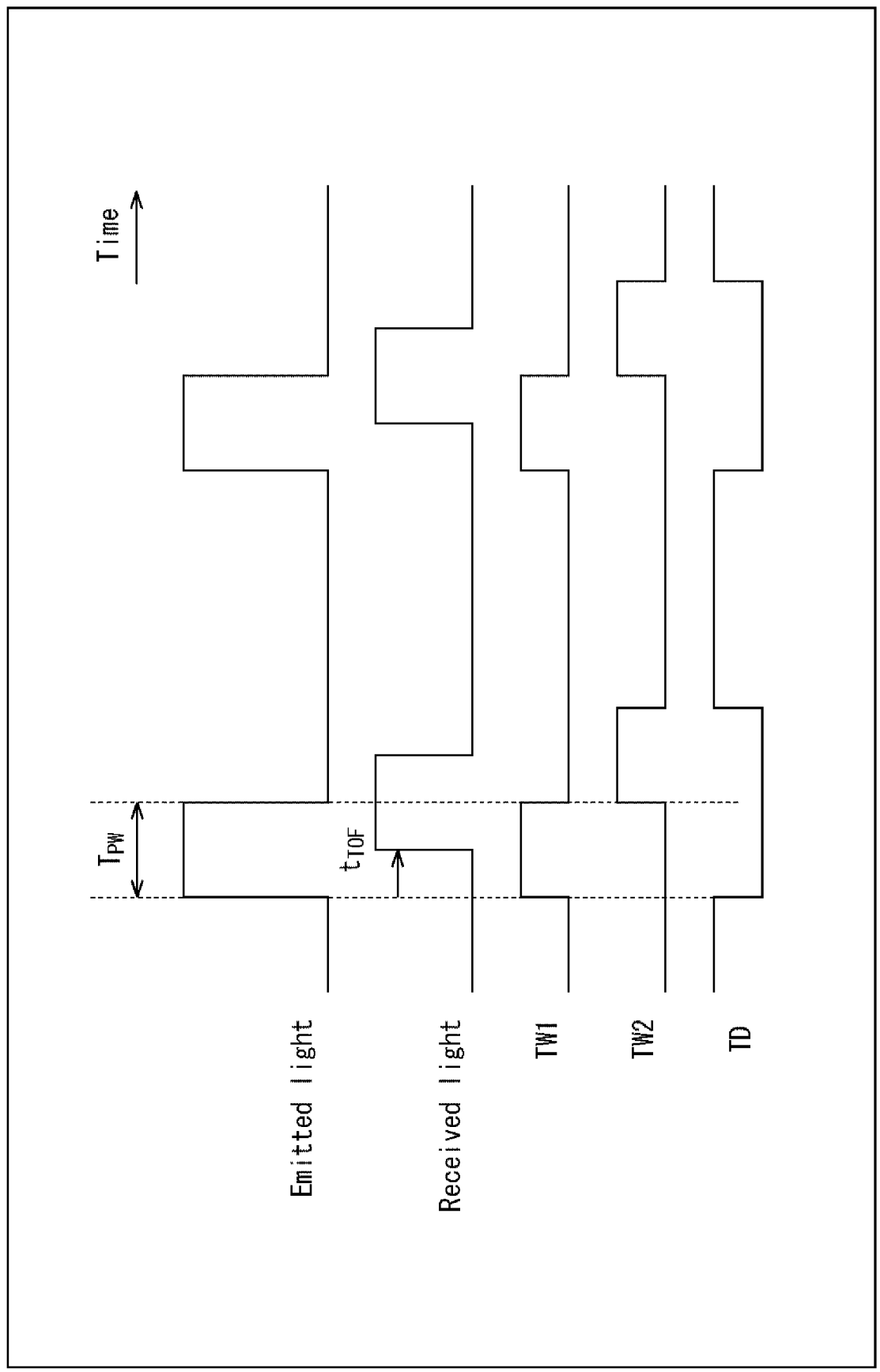
FIG. 3 is a diagram depicting an example of a state of distance measurement by the indirect ToF method.

On the other hand, FIG. 3 depicts an example of a state of the pulse wave modulation. In a case of the pulse wave modulation, assuming that signals accumulated by TW1 and TW2 are $A_0$ and $A_1$, the time of flight $t_{TOF}$ is derived as in the following Expression (3).

[Expression 3]

$$t_{TOF} = \frac{N_2}{N_1 + N_2} T_0 \qquad (3)$$

TD is a discharge window, and excess background light is discharged. By setting the number of time windows TW to three or more, only the background light component can be known, and the distance can be estimated without being affected by the background light. In the pulse wave modulation, it is possible to achieve robust imaging with respect to the background light by setting a duty ratio of the light source to be high.

However, unlike image data for viewing that humans enjoy viewing, data for sensing often requires a large dynamic range, and a data format with a large bit depth is often used to represent data. Due to this large bit depth, there is a possibility that the amount of memory, transmission cost, calculation cost, or the like increases due to transmission of the data for sensing, noise reduction processing, or the like.

In general, the data for sensing requires a wide dynamic range, but the required accuracy is not uniform. For example, in a case of depth data in proximity, accuracy in units of mm is required, but in a case of a distance in units of several 10 m, accuracy in cm is sufficient. Such a case often has a similar tendency with respect to intermediate data and intermediate processing of sensing data.

Accordingly, the bit depth of the intermediate data generated from the sensing data obtained in the indirect time-of-flight (TOF) sensor is corrected. For example, the bit depth of the intermediate data generated from the sensing data obtained in a sensor of the indirect time-of-flight (TOF) method is corrected, and the intermediate data with the bit depth corrected is encoded, and coded data is generated.

In this manner, an increase in the data amount of the sensing data (intermediate data) can be suppressed. Therefore, an increase in load of processing of the sensing data (intermediate data) can be suppressed. For example, it is possible to suppress an increase in load of calculation, storage, transmission, and the like using the sensing data (intermediate data).

2. First Embodiment

<Distance Measuring Device>

Figure 4:
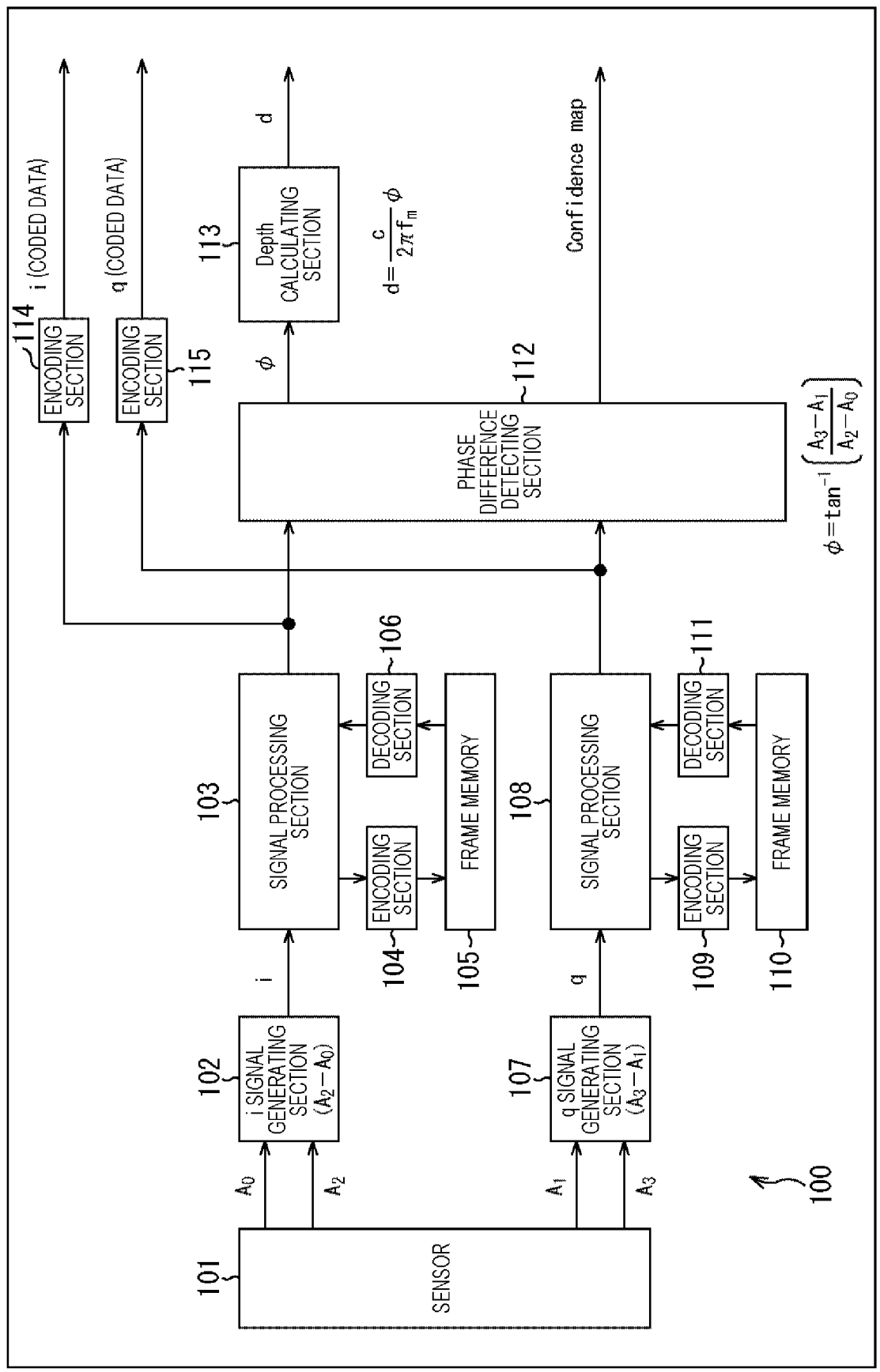
FIG. 4 is a block diagram depicting a main configuration example of a distance measuring device.

FIG. 4 is a block diagram depicting an example of a configuration of a distance measuring device that is an aspect of an information processing device to which the present technology is applied. A distance measuring device 100 depicted in FIG. 4 is a device that measures a distance to a subject by the indirect TOF method. Note that while FIG. 4 depicts main elements such as processing sections and data flows, those depicted in FIG. 4 do not necessarily include all elements. That is, in the distance measuring device 100, a processing section not depicted as a block in FIG. 4 may exist, or a process or data flow not depicted as an arrow or the like in FIG. 4 may exist.

As depicted in FIG. 4, the distance measuring device 100 includes a sensor 101, an i signal generating section 102, a signal processing section 103, an encoding section 104, a frame memory 105, a decoding section 106, a q signal generating section 107, a signal processing section 108, an encoding section 109, a frame memory 110, a decoding section 111, a phase difference detecting section 112, a depth calculating section 113, an encoding section 114, and an encoding section 115.

The sensor 101 is a sensor that detects light (reflected light) from a subject corresponding to irradiation light applied to the subject from a light source (not illustrated). The sensor 101 corresponds to, for example, the indirect TOF method as described with reference to FIGS. 2 and 3, and outputs the signals $A_0$ to $A_3$ accumulated in the four time windows TW1 to TW4 as the sensing data. The sensor 101 supplies the signal $A_0$ accumulated in the time window TW1 and the signal $A_2$ accumulated in the time window TW3 to the i signal generating section 102 as the sensing data. Furthermore, the sensor 101 supplies the signal $A_1$ accumulated in the time window TW2 and the signal $A_3$ accumulated in the time window TW4 to the q signal generating section 107 as the sensing data.

The i signal generating section 102 performs processing related to generation of an i signal that is intermediate data of the sensing data obtained in the sensor 101. For example, the i signal generating section 102 acquires the signal $A_0$ and the signal $A_2$ supplied from the sensor 101. Furthermore, the i signal generating section 102 derives the i signal by calculating a difference ($A_2-A_0$) between these signals. Moreover, the i signal generating section 102 supplies the derived i signal to the signal processing section 103.

The signal processing section 103 performs processing related to signal processing on the i signal. For example, the signal processing section 103 acquires the i signal supplied from the i signal generating section 102. Furthermore, the signal processing section 103 performs signal processing on the i signal. The content of this signal processing is arbitrary. The signal processing section 103 may perform a plurality of pieces of signal processing or may perform the same signal processing a plurality of times. Of course, the signal processing can be omitted.

The signal processing section 103 stores the i signal as a signal processing target in the frame memory 105 as necessary. At that time, the signal processing section 103 supplies the i signal to the encoding section 104 to encode the i signal, and stores the i signal in the frame memory 105 as coded data.

Furthermore, the signal processing section 103 reads the i signal stored in the frame memory 105 as necessary. At that time, the signal processing section 103 acquires the i signal obtained by decoding the coded data read from the frame memory 105 in the decoding section 106.

Note that the writing and reading to and from the frame memory 105 may be performed at any timing. For example, the writing and reading may be performed before, after, or during the signal processing by the signal processing section 103. Furthermore, this writing and reading may be repeated a plurality of times. For example, the writing and reading may be performed at each timing of before, during, and after the signal processing.

Moreover, the signal processing section 103 supplies the i signal subjected to the appropriate signal processing to the phase difference detecting section 112. Note that the signal processing section 103 can also supply the i signal to the encoding section 114.

The encoding section 104 performs processing related to encoding of the i signal. For example, the encoding section 104 encodes the i signal supplied from the signal processing section 103 and generates coded data thereof. Then, the encoding section 104 supplies the generated coded data of the i signal to the frame memory 105. That is, the encoding section 104 performs processing related to encoding of the i signal to be stored in the frame memory 105.

As described above, by the encoding section 104 encoding the i signal, it is possible to suppress an increase in the data amount of the i signal to be stored in the frame memory 105. That is, it is possible to suppress an increase in a load (storage capacity used to store the i signal) of the frame memory 105 and to improve utilization efficiency of the frame memory 105. In other words, an increase in the storage capacity required as the frame memory 105 can be suppressed, and an increase in the manufacturing cost and power consumption of the frame memory 105 can be suppressed. Furthermore, it is possible to suppress an increase in a processing time (what is called writing time) for writing the i signal (coded data) in the frame memory 105 and a processing time (what is called reading time) for reading the i signal (coded data) from the frame memory 105, and it is possible to suppress an increase in the processing time of the signal processing section 103.

The frame memory 105 includes an arbitrary storage medium such as a semiconductor memory, for example, and performs processing related to storage of the i signal. For example, the frame memory 105 acquires the coded data of the i signal supplied from the encoding section 104 and stores the acquired coded data in the storage medium. Furthermore, the frame memory 105 reads the i signal (coded data) stored in the storage medium, and supplies the i signal to the decoding section 106. That is, the frame memory 105 stores a target (i signal) of the signal processing of the signal processing section 103. Note that the storage medium may be any storage medium, and may be, for example, a flash memory or a hard disk, or may be a removable medium that is detachable.

The decoding section 106 performs processing related to decoding of the coded data of the i signal. For example, the decoding section 106 decodes the coded data supplied from the frame memory 105 and generates the i signal. Then, the decoding section 106 supplies the generated i signal to the signal processing section 103. That is, the decoding section 106 performs processing related to decoding of the i signal stored in the frame memory 105.

In this manner, the signal processing section 103 can perform signal processing on the i signal read from the frame memory 105 in an uncoded plain state. That is, the target (i signal) of the signal processing by the signal processing section 103 can be encoded and stored as described above. Therefore, the effects as described above can be obtained for the frame memory 105 that stores the target (i signal) of the signal processing of the signal processing section 103.

The q signal generating section 107 performs processing related to generation of a q signal that is intermediate data of sensing data obtained in the sensor 101. For example, the q signal generating section 107 acquires the signal $A_1$ and the signal $A_3$ supplied from the sensor 101. Furthermore, the q signal generating section 107 derives the q signal by calculating a difference $(A_3-A_1)$ between these signals. Moreover, the q signal generating section 107 supplies the derived q signal to the signal processing section 108.

The signal processing section 108, the encoding section 109, the frame memory 110, and the decoding section 111 have configurations similar to those of the signal processing section 103, the encoding section 104, the frame memory 105, and the decoding section 106, respectively, and can perform similar processing and obtain similar effects. However, the respective processing sections of the signal processing section 108 to the decoding section 111 assumes the q signal instead of the i signal as the target of processing. That is, the signal processing section 108 performs processing related to signal processing on the q signal. The encoding section 109 performs processing related to encoding of the q signal to be stored in the frame memory 110. The frame memory 110 stores the target (q signal) of the signal processing of the signal processing section 108. The decoding section 111 performs processing related to decoding of the q signal stored in the frame memory 110.

The phase difference detecting section 112 performs processing related to detection of a phase difference between the light emission signal and the reception signal. For example, the phase difference detecting section 112 acquires the i signal supplied from the signal processing section 103. Furthermore, the phase difference detecting section 112 acquires the q signal supplied from the signal processing section 108. Moreover, the phase difference detecting section 112 calculates the phase difference $\varphi_{TOF}$ between the light emission signal and the reception signal by calculating the above-described Expression (1) using the acquired i signal and q signal.

The phase difference detecting section 112 can output the calculated phase difference $\varphi_{TOF}$ to the outside of the distance measuring device 100. For example, the phase difference detecting section 112 can calculate the phase difference $\varphi_{TOF}$ for each pixel or each partial region and output the phase difference $\varphi_{TOF}$ to the outside of the distance measuring device 100 as map information of the phase difference $\varphi_{TOF}$. For example, the phase difference detecting section 112 can output the map information of the phase difference $\varphi_{TOF}$ to the outside of the distance measuring device 100 as reliability map information (confidence map).

Furthermore, the phase difference detecting section 112 can supply the calculated phase difference $\varphi_{TOF}$ to the depth calculating section 113.

The depth calculating section 113 performs processing related to calculation of a depth value. For example, the depth calculating section 113 can acquire the phase difference $\varphi_{TOF}$ between the light emission signal and the reception signal supplied from the phase difference detecting section 112. Furthermore, the depth calculating section 113 can estimate the distance (that is, the depth value) d to the subject by calculating the following Expression (4) using the acquired phase difference $\varphi_{TOF}$.

[Expression 4]

$$d = \frac{c}{2\pi f_m} \phi \qquad (4)$$

Moreover, the depth calculating section 113 can output the depth value d calculated as described above to the outside of the distance measuring device 100. For example, the depth calculating section 113 can calculate the depth value d as described above for each pixel or each partial region, and output the depth value d to the outside of the distance measuring device 100 as map information (depth image).

The encoding section 114 performs processing related to encoding of the i signal, similarly to the encoding section 104. That is, the encoding section 114 has a configuration similar to that of the encoding section 104, and performs similar processing. In other words, the encoding section 114 encodes the i signal supplied from the signal processing section 103 and generates coded data thereof. However, the encoding section 114 outputs the generated coded data of the i signal to the outside of the distance measuring device 100. That is, the encoding section 114 performs processing related to encoding of the i signal to be output to the outside of the distance measuring device 100.

In other words, the distance measuring device 100 can output the i signal that is intermediate data. Then, when the encoding section 114 encodes the i signal, the distance measuring device 100 can encode and output the i signal. In this manner, it is possible to suppress an increase in the transmission band used for transmission of the output i signal and the storage capacity required for storage of the output i signal. Therefore, an increase in cost can be suppressed.

The encoding section 115 has a configuration similar to that of the encoding section 114, performs similar processing, and can obtain similar effects. However, the encoding section 115 assumes the q signal instead of the i signal as the target of processing. That is, the encoding section 115 encodes the q signal supplied from the signal processing section 108 and generates coded data thereof. Then, the encoding section 115 outputs the generated coded data of the q signal to the outside of the distance measuring device 100. That is, the encoding section 115 performs processing related to encoding of the q signal to be output to the outside of the distance measuring device 100.

In other words, the distance measuring device 100 can output the q signal that is intermediate data. Then, the encoding section 115 encodes the q signal, so that the distance measuring device 100 can encode and output the q signal. In this manner, it is possible to suppress an increase in the transmission band used for transmission of the output q signal and the storage capacity required for storage of the output q signal. Therefore, an increase in cost can be suppressed.

Note that, in the distance measuring device 100, the i signal and the q signal are processed independently of each other. To this extent, the configuration of the distance measuring device 100 is arbitrary and is not limited to the above-described example. For example, the i signal generating section 102 and the q signal generating section 107 may be integrated into one signal generating section. Furthermore, the signal processing section 103 and the signal processing section 108 may be integrated into one signal processing section. Moreover, the encoding section 104 and the encoding section 109 may be integrated into one encoding section. Furthermore, the frame memory 105 and the frame memory 110 may be integrated into one frame memory. Moreover, the decoding section 106 and the decoding section 111 may be integrated into one decoding section 111.

As described above, also in a case where the processing section that processes the i signal and the processing section that processes the q signal are integrated, the i signal and the q signal are processed independently of each other. For example, the i signal and the q signal may be processed independently of each other by time division, or two systems of input and output may be provided.

Note that each of these processing sections (the sensor 101 to the encoding section 115) of the distance measuring device 100 has an arbitrary configuration. For example, each processing section may be configured by a logic circuit that achieves the above-described processing. Furthermore, each processing section may include, for example, a central processing unit (CPU), a read only memory (ROM), a random access memory (RAM), and the like, and execute a program using them, to thereby implement the above-described processing. Of course, each processing section may have both the configurations, and a part of the above-described processing may be implemented by a logic circuit and the other may be implemented by executing a program. The configurations of the processing sections may be independent from each other, and for example, a part of the processing sections may implement a part of the above-described processing by a logic circuit, another part of the processing sections may implement the above-described processing by executing a program, and still another of the processing sections may implement the above-described processing by both the logic circuit and the execution of the program.

<Encoding Section>

Figure 5:
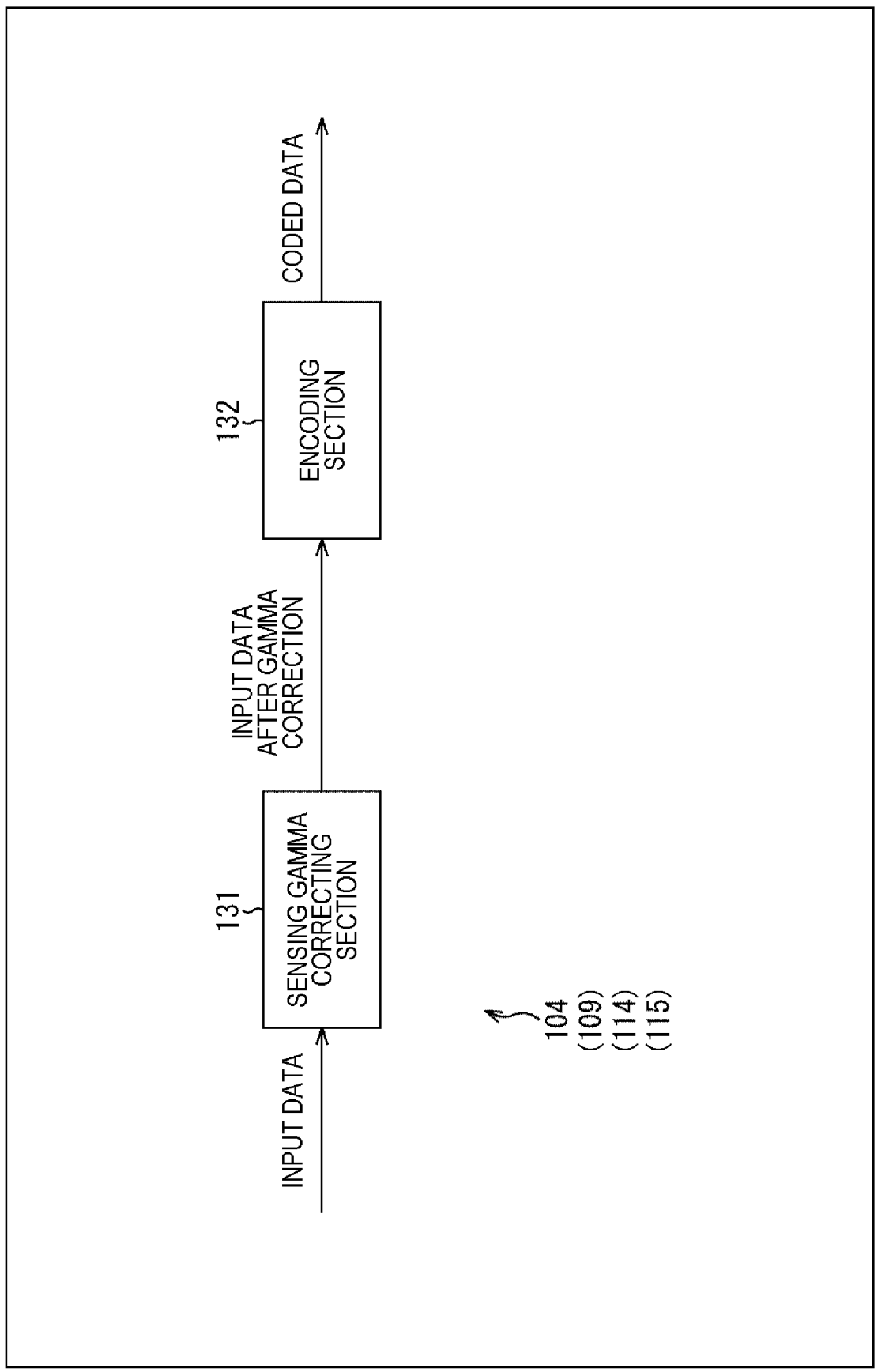
FIG. 5 is a block diagram depicting a main configuration example of an encoding section.

FIG. 5 is a block diagram depicting a main configuration example of the encoding section 104 in FIG. 4. Note that while FIG. 5 depicts main elements such as processing sections and data flows, those depicted in FIG. 5 do not necessarily include all elements. That is, in the encoding section 104, a processing section not depicted as a block in FIG. 5 may exist, or a process or data flow not depicted as an arrow or the like in FIG. 5 may exist.

As depicted in FIG. 5, the encoding section 104 includes a sensing gamma correcting section 131 and an encoding section 132.

The sensing gamma correcting section 131 performs processing related to correction of the bit depth of the input data. For example, the sensing gamma correcting section 131 acquires the i signal that is intermediate data of the sensing data as input data from the outside of the encoding section 104 (for example, the signal processing section 103). Furthermore, the sensing gamma correcting section 131 corrects the bit depth of the i signal. At that time, the sensing gamma correcting section 131 corrects the bit depth of the i signal (performs gamma correction) using a gamma curve that is a predetermined curve indicating input-output characteristics. For example, the sensing gamma correcting section 131 reduces the bit depth of the i signal at a compression rate corresponding to the gamma curve. Moreover, the sensing gamma correcting section 131 supplies the i signal after the bit depth correction (after gamma correction) to the encoding section 132.

The encoding section 132 performs processing related to encoding of the i signal. For example, the encoding section 132 acquires the i signal after the gamma correction supplied from the sensing gamma correcting section 131, and encodes the i signal to generate coded data. A method of the encoding is arbitrary. For example, an existing image encoding method may be used. The encoding section 132 supplies the generated coded data of the i signal to the outside of the encoding section 104 (for example, the frame memory 105).

As described above, since the sensing gamma correcting section 131 performs correction so as to reduce the bit depth of the i signal, the encoding section 104 can suppress a decrease in encoding efficiency of (the i signal that is intermediate data of) the sensing data. Therefore, the distance measuring device 100 can suppress an increase in the load of processing of the sensing data as described above.

Note that the encoding section 109 also has a configuration similar to that of the encoding section 104. That is, the configuration example depicted in FIG. 5 can also be applied to the encoding section 109. However, in a case of the encoding section 109, the processing target is the q signal.

Furthermore, the encoding section 114 also has a configuration similar to that of the encoding section 104. That is, the configuration example depicted in FIG. 5 can also be applied to the encoding section 114. However, in a case of the encoding section 114, the coded data of the i signal generated by the encoding section 132 is output to the outside of the distance measuring device 100.

Moreover, the encoding section 115 also has a configuration similar to that of the encoding section 104. That is, the configuration example depicted in FIG. 5 can also be applied to the encoding section 115. However, in a case of the encoding section 115, the processing target is the q signal, and the coded data of the q signal generated by the encoding section 132 is output to the outside of the distance measuring device 100.

That is, as described above, in a case of the distance measuring device 100, the i signal and the q signal are processed independently of each other. In other words, the sensing gamma correcting section 131 can correct the bit depth of the i signal and the bit depth of the q signal independently of each other. Furthermore, the encoding section 132 can encode the i signal and the q signal with the bit depths corrected independently of each other, and generate each of the coded data of the i signal and the coded data of the q signal.

<Decoding Section>

Figure 6:
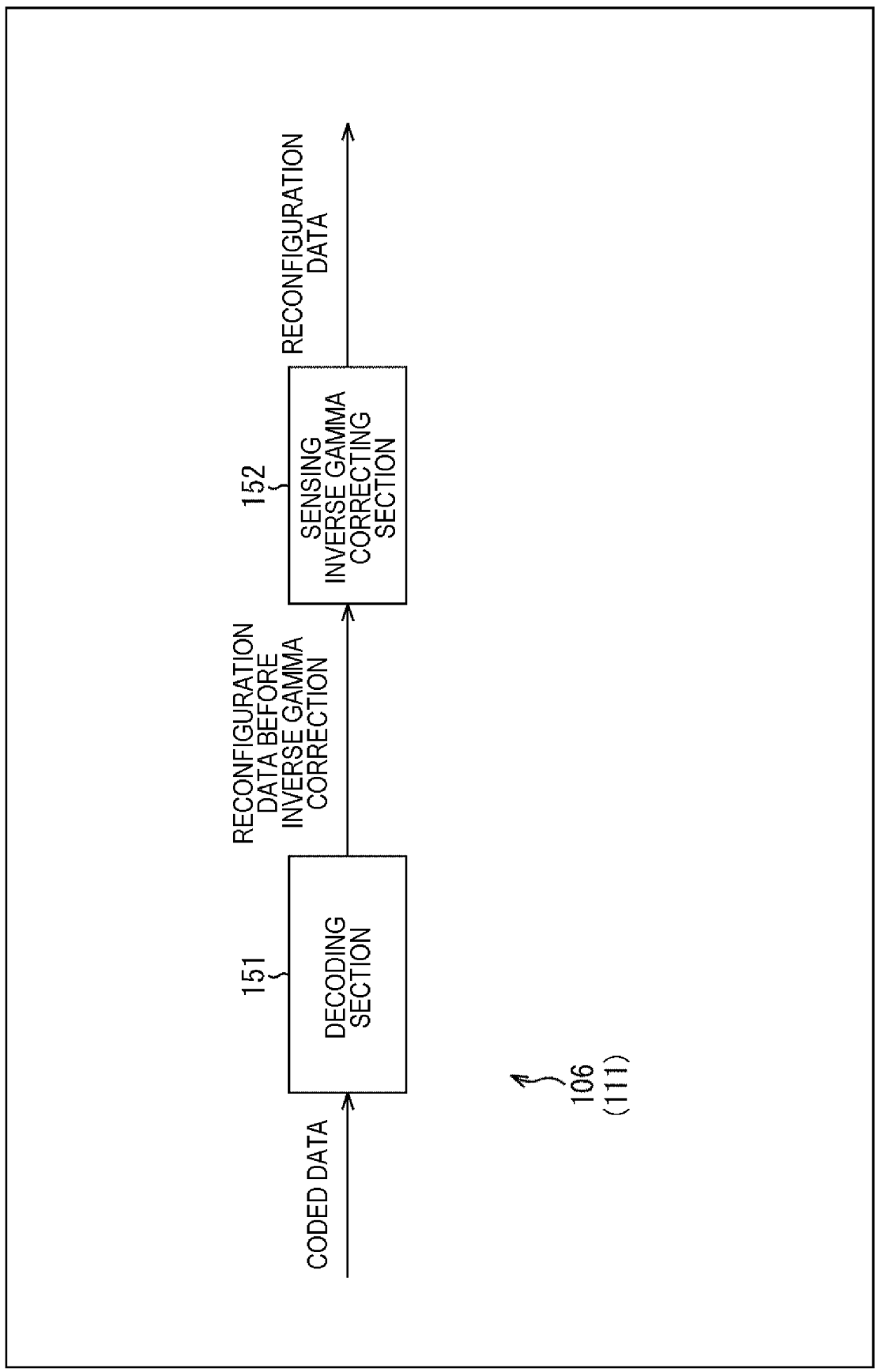
FIG. 6 is a block diagram depicting a main configuration example of a decoding section.

FIG. 6 is a block diagram depicting a main configuration example of the decoding section 106 in FIG. 4. Note that while FIG. 6 depicts main elements such as processing sections and data flows, those depicted in FIG. 6 do not necessarily include all elements. That is, in the decoding section 106, a processing section not depicted as a block in FIG. 6 may exist, or a process or data flow not depicted as an arrow or the like in FIG. 6 may exist.

As depicted in FIG. 6, the decoding section 106 includes a decoding section 151 and a sensing inverse gamma correcting section 152.

The decoding section 151 performs processing related to decoding of the coded data of the i signal. For example, the decoding section 151 acquires the coded data of the i signal read from the outside of the decoding section 106 (for example, the frame memory 105). Furthermore, the decoding section 151 decodes the coded data and generates the i signal (reconfiguration data before inverse gamma correction). A method of the decoding is arbitrary as long as it is a method corresponding to the encoding method applied by the encoding section 132. For example, an existing image decoding method may be used. That is, the decoding section 151 performs inverse processing of the encoding section 132. Moreover, the decoding section 151 supplies the generated i signal (reconfiguration data before inverse gamma correction) to the sensing inverse gamma correcting section 152.

The sensing inverse gamma correcting section 152 performs processing related to inverse correction of the bit depth of the i signal. For example, the sensing inverse gamma correcting section 152 acquires the i signal (reconfiguration data before inverse gamma correction) supplied from the decoding section 151. Furthermore, the sensing inverse gamma correcting section 152 inversely corrects the bit depth of the i signal (reconfiguration data before inverse gamma correction). At that time, the sensing inverse gamma correcting section 152 inversely corrects the bit depth of the i signal (performs inverse gamma correction) using an inverse gamma curve that is a predetermined curve indicating input-output characteristics.

The inverse gamma curve is an inverse function of the gamma curve used by the sensing gamma correcting section 131. That is, the inverse gamma correction is inverse processing of the gamma correction performed by the sensing gamma correcting section 131. For example, the sensing inverse gamma correcting section 152 restores the bit depth of the i signal reduced at the compression rate corresponding to the gamma curve at an expansion rate corresponding to the inverse gamma curve. That is, it is returned to the bit depth before the reduction.

Moreover, the sensing inverse gamma correcting section 152 supplies the i signal (reconfiguration data) whose bit depth has been restored to the outside of the decoding section 106 (for example, the signal processing section 103).

In this manner, since the sensing inverse gamma correcting section 152 performs correction so as to restore the bit depth of the i signal, the decoding section 106 can return (the i signal that is intermediate data of) the sensing data to the original bit depth. That is, the decoding section 106 can suppress a decrease in the encoding efficiency of (the i signal that is intermediate data of) the sensing data. Therefore, the distance measuring device 100 can suppress an increase in the load of processing of the sensing data as described above.

Note that the decoding section 111 also has a configuration similar to that of the decoding section 106. That is, the configuration example depicted in FIG. 6 can also be applied to the decoding section 111. However, in the case of the decoding section 111, the processing target is the q signal.

That is, as described above, in a case of the distance measuring device 100, the i signal and the q signal are processed independently of each other. In other words, the decoding section 151 can decode the coded data of the i signal and the coded data of the q signal independently of each other to generate the i signal and the q signal, respectively. Furthermore, the sensing inverse gamma correcting section 152 can inversely correct (that is, returned to the original bit depth) the bit depth of the i signal and the bit depth of the q signal independently of each other.

<Gamma Curve and Inverse Gamma Curve>

Figure 7:
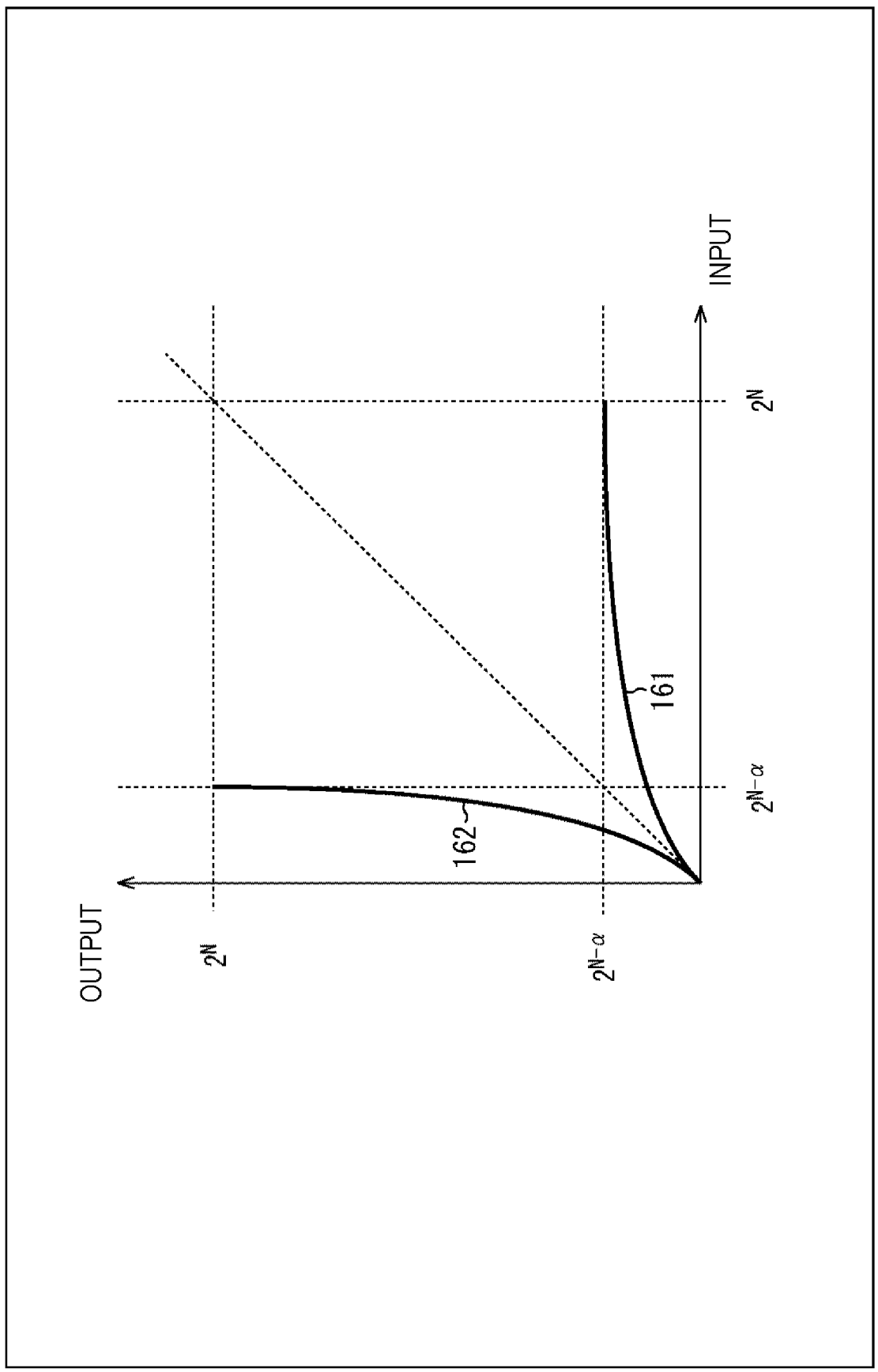
FIG. 7 is a diagram depicting an example of a gamma curve.

An example of the gamma curve and the inverse gamma curve described above is depicted in FIG. 7. The gamma curve 161 and the inverse gamma curve 162 depicted in FIG. 7 are inverse functions of each other. That is, the correction of the bit depth by the sensing gamma correcting section 131 and the inverse correction of the bit depth by the sensing inverse gamma correcting section 152 are reversible processing, and are inverse processing of each other. That is, by performing the correction and the inverse correction on the i signal and the q signal, the i signal and the q signal can be returned to the original signal values.

The gamma curve and the inverse gamma curve may be designed on the basis of calculation accuracy required in subsequent processing. That is, the sensing gamma correcting section 131 may correct the bit depth of the i signal or q signal using a gamma curve designed on the basis of the calculation accuracy required in the subsequent processing. Furthermore, the sensing inverse gamma correcting section 152 may inversely correct the bit depth of the i signal and the q signal using an inverse gamma curve designed on the basis of the calculation accuracy required in the subsequent processing.

<Signal Characteristics>

Here, prior to the calculation method of the gamma curve, necessary data accuracy caused by generation of a depth signal (depth data) of the indirect ToF method (iToF) will be described. As described above, in the iToF, the phase difference between the light emission signal and the reception signal is detected using an arctan using the i signal and the q signal, and the phase signal is converted into the depth information (depth data).

Figure 8:
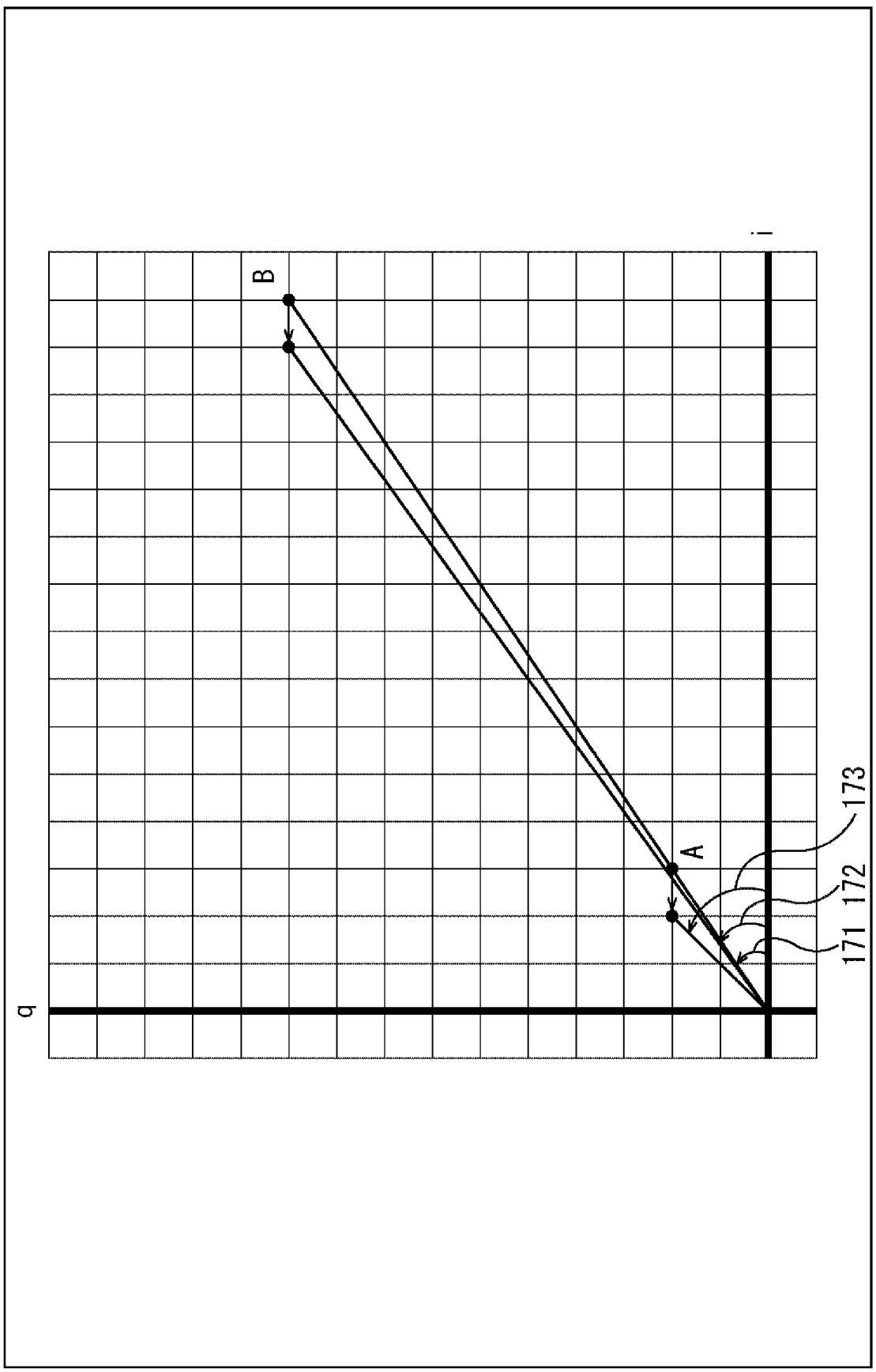
FIG. 8 is a diagram depicting design of a gamma curve.

Here, two signals having different i and q are considered while having the same depth distance. In the graph depicted in FIG. 8, a signal having a small L2 norm and being close to the origin is denoted by A, and a signal having a large L2 norm and being far from the origin is denoted by B. Here, it is assumed that some noise is superimposed on the signal A and the signal B, and the value of i decreases by 1 (horizontal arrow in the drawing). The phase difference of the signal A and the signal B before noise superimposition is represented by an angle 171. Due to the noise superposition, the phase difference of signal B corresponds to an angle 172 and the phase difference of signal A corresponds to an angle 173. That is, as can be seen from the values after each noise superimposition, in iToF, a pixel value with a small L2 norm is sensitive to degradation, and as the L2 norm increases, the influence of degradation decreases.

By this example, it can be seen that accuracy of data required for the i signal and the q signal varies depending on the absolute value of the value of the i signal and the q signal, high accuracy is required in a case where the absolute value is small, and there is no problem even with low accuracy in a case where the absolute value is large. Therefore, holding data with uniform accuracy regardless of the magnitude of the absolute value has redundant accuracy in holding data, which causes an increase in cost.

In other words, the sensing gamma correcting section 131 corrects (reduces) the bit depth of the i signal and the q signal using the gamma curve as described above, and the sensing inverse gamma correcting section 152 inversely corrects (restores) the bit depth of the i signal and the q signal using the inverse gamma curve as described above, so that an increase in redundancy thereof can be suppressed. That is, an increase in cost can be suppressed.

<Design of Gamma Curve>

Figure 9:
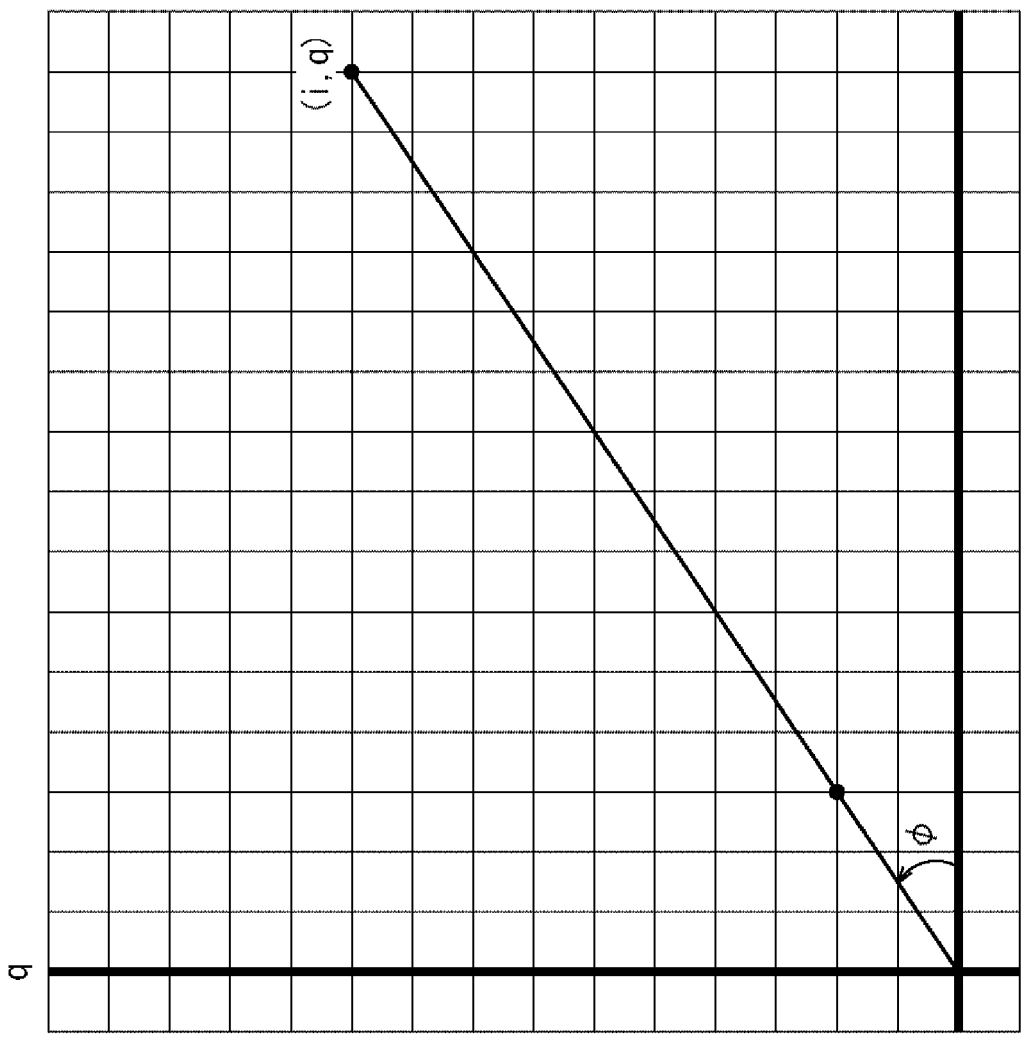
FIG. 9 is a diagram depicting design of a gamma curve.

Next, a method for designing a gamma curve as described above will be described. For example, as depicted in a graph of FIG. 9, when the signal value of the i signal generated by the difference between the sensor outputs is denoted by i, the signal value of the q signal is denoted by q, and the phase difference between the light emission signal and the reception signal derived using these signal values is denoted by φ, the following Expression (5) is established.

[Expression 5]

$$\tan \phi = \frac{q}{i}. \quad (5)$$

Since the following Expression (6) is established from Expression (5), the accuracy required for i can be calculated as in the following Expression (7).

[Expression 6]

$$i = \frac{q}{\tan \phi} \quad (6)$$

[Expression 7]

$$\frac{\partial i}{\partial \phi} = \frac{\partial}{\partial \phi} \cdot \frac{q}{\tan \phi} = -\frac{q}{\tan \phi^2} \cdot \frac{1}{\cos \phi^2} \quad (7)$$

The accuracy required for i can be calculated as in the following Expression (9) from the above-described Expressions (5) and (7) and the following Expression (8).

[Expression 8]

$$\cos \phi = \frac{i}{\sqrt{i^2 + q^2}} \quad (8)$$

[Expression 9]

$$\frac{\partial i}{\partial \phi} = \frac{i^2 + q^2}{q} \quad (9)$$

By similar calculation, accuracy of q can also be calculated as in the following Expression (10).

[Expression 10]

$$\frac{\partial q}{\partial \phi} = \frac{i^2 + q^2}{i} \quad (10)$$

From these, quantization values (quant$_i$ and quant$_q$) applicable to i and q in a case where accuracy of phase φ is kept constant can be obtained by scaling the absolute value as in the following Expressions (11) and (12).

[Expression 11]

$$quant_i = A \cdot \left| \frac{i^2 + q^2}{q} \right| \quad (11)$$

[Expression 12]

$$quant_q = A \cdot \left| \frac{i^2 + q^2}{i} \right| \quad (12)$$

The gamma curve is derived using the quantization values derived as described above. In a case where i is fixed, the quantization values (quant$_i$ and quant$_q$) expressed by Expression (11) and Expression (12) take minimum values when q=i. Thus, a minimum quantization value min_quan(x) is calculated for both i and q by using the following Expression (13).

[Expression 13]

$$\min\_quan(x) = A \cdot |x| \quad (13)$$

Figure 10:
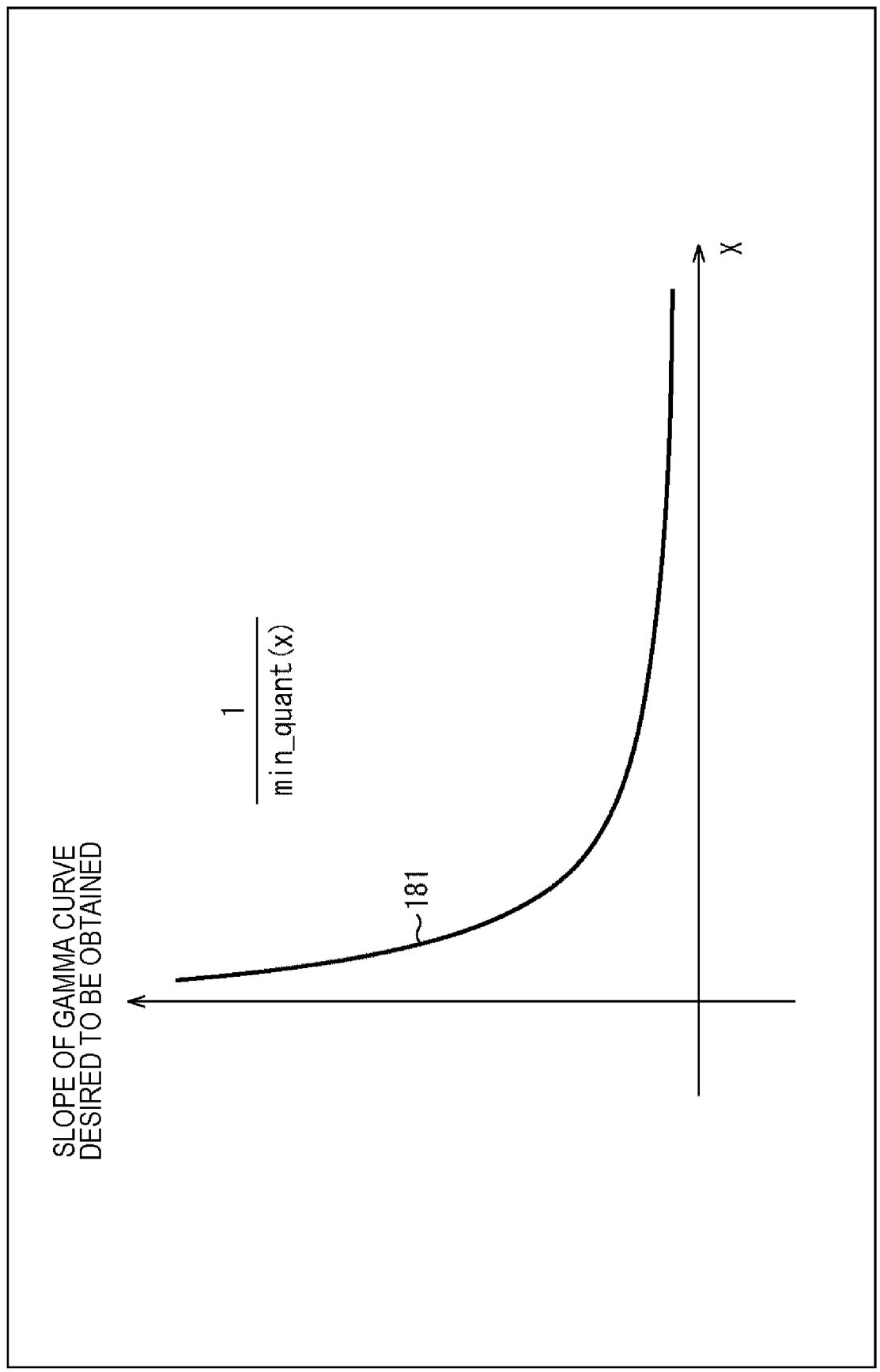
FIG. 10 is a diagram depicting design of a gamma curve.

The gamma curve to be obtained is designed as a curve that can be quantized by the above-described expression. As in a curve 181 depicted in FIG. 10, the inclination of the gamma curve desired to be obtained can be calculated from the inverse number of the minimum quantization value.

Figure 11:
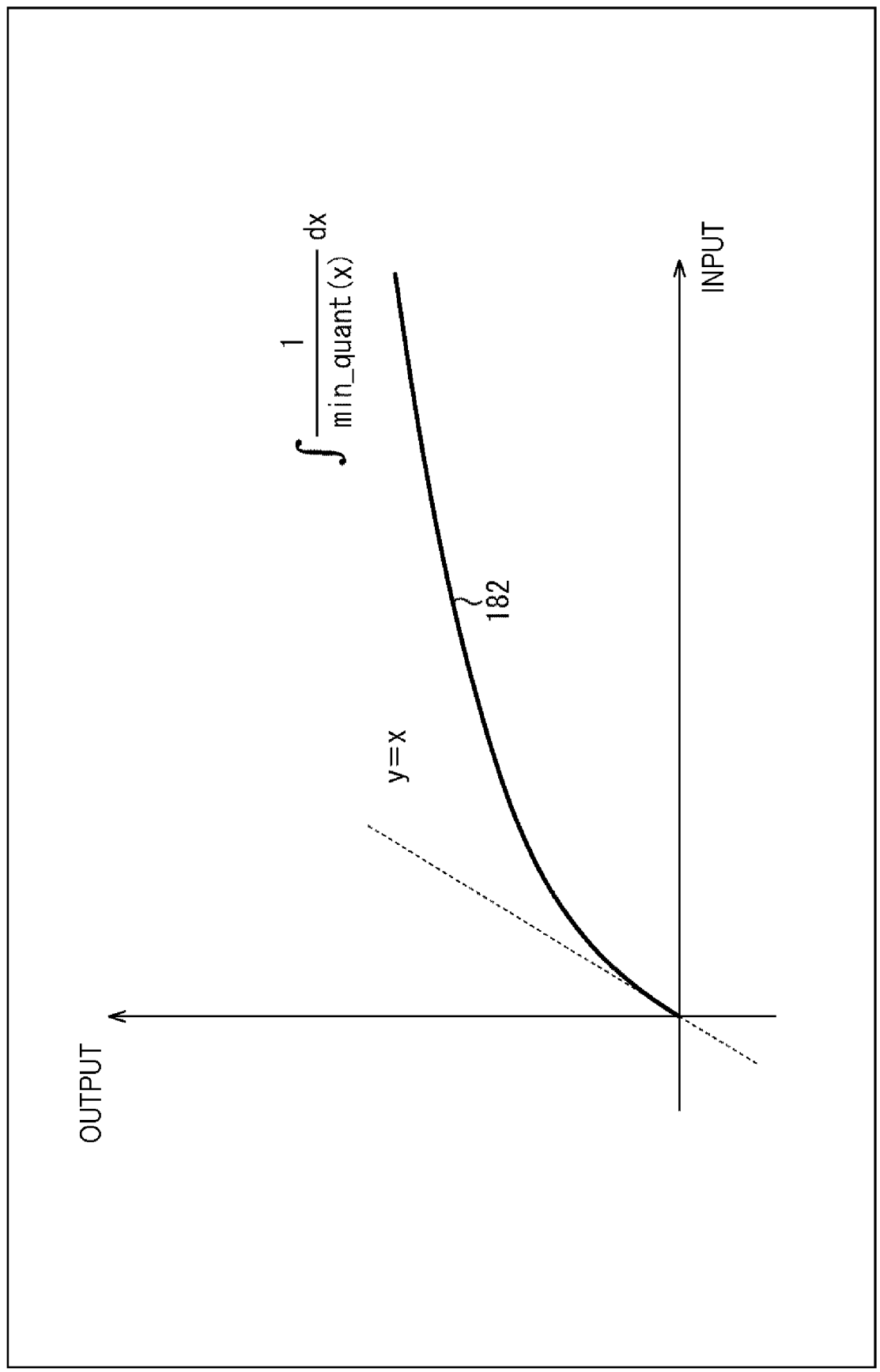
FIG. 11 is a diagram depicting design of a gamma curve.

By integrating the inclination of the gamma curve, that is, the inverse number of the minimum quantization value as in the curve 182 depicted in FIG. 11, the gamma curve optimal for the i signal and the q signal of iToF can be calculated. When the calculated gamma curve is equal to or less than a straight line of y=x, compression of the data amount by the gamma curve is possible. Note that A, which is a parameter of the minimum quantization value, is a parameter to be adjusted according to accuracy desired to be obtained and a compression rate desired to be achieved.

In this example, the optimum gamma curve calculation method has been described on the basis of the accuracy (=quantization value) of i and q necessary for processing the iToF signal, but this calculation method is not limited to this example. For example, the present method can be applied to any sensing system by setting the minimum quantization value according to system requirements or the like.

<Flow of Distance Measurement Processing>

Next, processing executed by the distance measuring device 100 will be described. First, an example of a flow of distance measurement processing when the distance measuring device 100 performs distance measurement will be described with reference to a flowchart of FIG. 12.

When the distance measurement processing is started, the sensor 101 of the distance measuring device 100 detects a signal (for example, the signals A$_0$ to A$_3$) accumulated in each time window in step S101.

In step S102, the i signal generating section 102 generates the i signal using the signal detected in step S101 (for example, A$_2$–A$_0$). In step S103, the q signal generating section 107 generates the q signal using the signal detected in step S101 (for example, A$_3$–A$_1$).

In step S104, the signal processing section 103 to the decoding section 106 execute i signal processing, and perform signal processing on the i signal generated in step S102. In step S105, the signal processing section 108 to the decoding section 111 execute q signal processing, and perform signal processing on the q signal generated in step S103.

In step S106, the phase difference detecting section 112 detects the phase difference between the light emission signal and the reception signal using the i signal subjected to the appropriate signal processing in step S104 and the q signal subjected to the appropriate signal processing in step S105.

In step S107, the phase difference detecting section 112 generates a confidence map on the basis of the phase difference detected in step S106 and outputs the configuration map to the outside of the distance measuring device 100. Note that the output of the confidence map can be omitted. In that case, this process can be omitted.

In step S108, the depth calculating section 113 calculates the depth value using the phase difference detected in step S106. In step S109, the depth calculating section 113 outputs the depth value to the outside of the distance measuring device 100 as depth data. Note that the output of the depth data can be omitted. In that case, these processes can be omitted.

In step S110, the encoding section 114 executes i signal encoding processing and generates coded data of the i signal. Furthermore, in step S111, the encoding section 115 executes q signal encoding processing and generates coded data of the q signal. Moreover, in step S112, the encoding section 114 outputs the coded data of the i signal generated in step S110 to the outside of the distance measuring device 100. Similarly, in step S113, the encoding section 115 outputs the coded data of the q signal generated in step S111 to the outside of the distance measuring device 100. Note that the output of the coded data of the i signal and the q signal can be omitted. In that case, these processes can be omitted.

When the process in step S113 ends, the distance measurement processing ends.

<Flow of i Signal Processing>

Next, an example of a flow of i signal processing executed in step S104 of FIG. 12 will be described with reference to a flowchart of FIG. 13. When the i signal processing is started, the signal processing section 103 determines whether or not to store the i signal in step S131. In a case where it is determined to store the i signal, the processing proceeds to step S132. In step S132, the encoding section 104 executes i signal encoding processing, and encodes the i signal to generate coded data. In step S133, the frame memory 105 stores the coded data of the i signal generated in step S132. When the process in step S133 ends, the processing proceeds to step S134. Furthermore, in a case where it is determined not to store the i signal in step S131, the processing proceeds to step S134.

In step S134, the signal processing section 103 determines whether or not to read the i signal. In a case where it is determined to read the i signal, the processing proceeds to step S135. In step S135, the frame memory 105 reads the coded data of the requested i signal. In step S136, the decoding section 106 performs i signal decoding processing, and decodes the coded data of the i signal to generate the i signal. When the process in step S136 ends, the processing proceeds to step S137. Furthermore, in a case where it is determined not to read the i signal in step S134, the processing proceeds to step S137.

In step S137, the signal processing section 103 determines whether or not to perform signal processing on the i signal. In a case where it is determined to perform the signal processing, the processing proceeds to step S138. In step S138, the signal processing section 103 performs the signal processing on the i signal. When the process in step S138 ends, the processing proceeds to step S139. Furthermore, in a case where it is determined not to perform the signal processing in step S137, the processing proceeds to step S139.

In step S139, the signal processing section 103 determines whether or not to end the signal processing. In a case where it is determined not to end the signal processing due to the presence of unprocessed data or unexecuted signal processing, or the like, the processing returns to step S131, and the subsequent processing is repeated. Furthermore, in a case where it is determined to end the signal processing by performing all the processes and the like in step S139, the processing proceeds to step S140.

In step S140, the signal processing section 103 supplies the i signal on which the signal processing has been appropriately performed to the phase difference detecting section 112. When the process in step S140 ends, the i signal processing ends, and the processing returns to FIG. 12.

Figure 13:
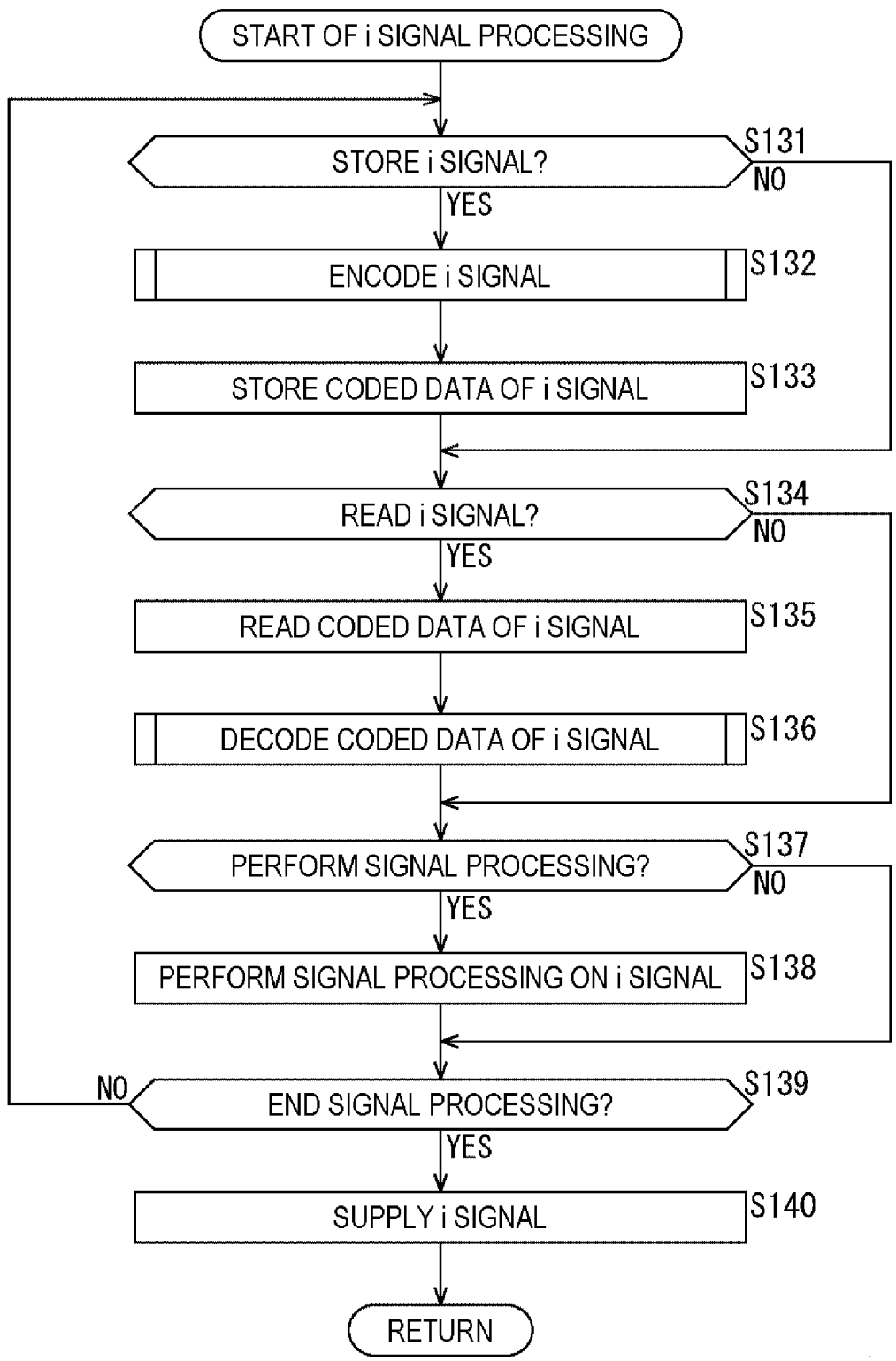
FIG. 13 is a flowchart depicting an example of a flow of i signal processing.

Note that, in this i signal processing, the processing order of the processing group of steps S131 to S133, the processing group of steps S134 to S136, and the processing group of steps S137 and S138 is arbitrary, and is not limited to the example of FIG. 13. For example, after the processing of steps S137 and S138 is performed, the processing of steps S131 to S133 and the processing of steps S134 to S136 may be performed. Furthermore, other orders may be used. That is, writing and reading of the i signal can be performed at an arbitrary timing of signal processing.

<Flow of i Signal Encoding Processing>

Figure 14:
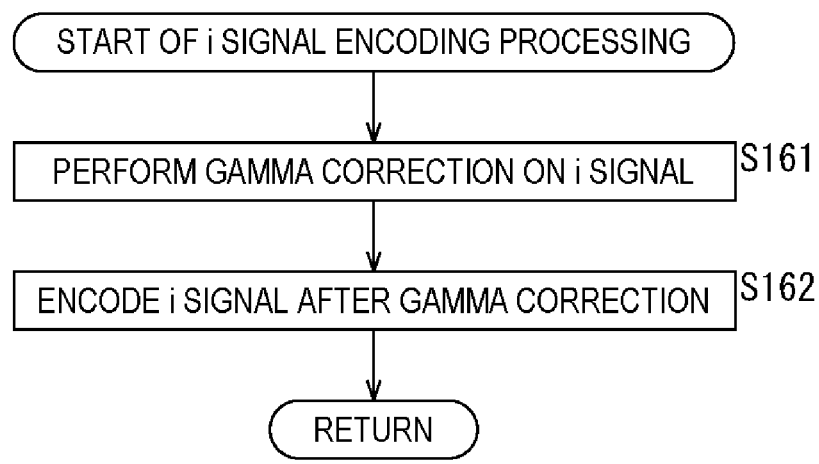
FIG. 14 is a flowchart depicting an example of a flow of i signal encoding processing.

Next, an example of a flow of i signal encoding processing executed in step S132 and the like of FIG. 13 will be described with reference to a flowchart of FIG. 14.

When the i signal encoding processing is started, the sensing gamma correcting section 131 of the encoding section 104 performs the gamma correction of the bit depth of the i signal using the gamma curve designed as described above in step S161.

In step S162, the encoding section 132 encodes the i signal subjected to the gamma correction in step S161, and generates coded data of the i signal. When the process in step S162 ends, the i signal encoding processing ends, and the processing returns to FIG. 13.

<Flow of i Signal Decoding Processing>

Figure 15:
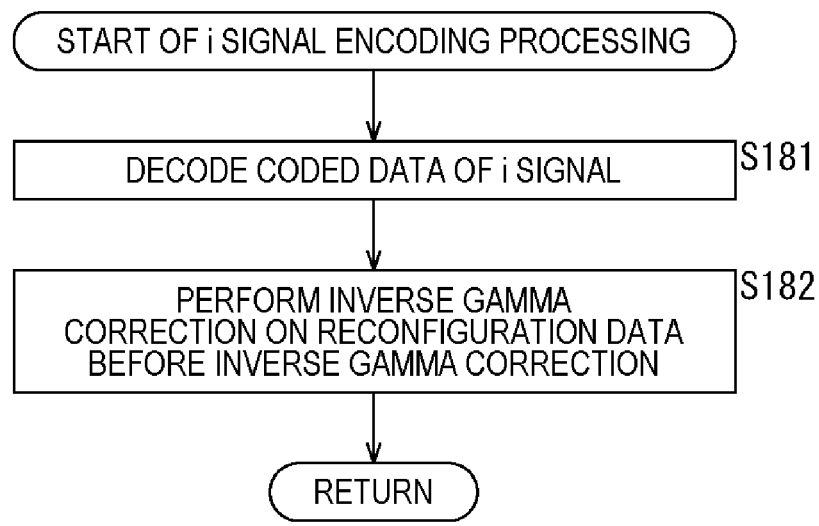
FIG. 15 is a flowchart depicting an example of a flow of i signal decoding processing.

Next, an example of a flow of the i signal decoding processing executed in step S136 and the like of FIG. 13 will be described with reference to a flowchart of FIG. 15.

When the i signal decoding processing is started, the decoding section 151 of the decoding section 106 decodes the coded data of the i signal and generates the i signal before the inverse gamma correction in step S181.

In step S182, the sensing inverse gamma correcting section 152 performs the inverse gamma correction on the bit depth of the i signal generated in step S181 using the inverse gamma curve designed as described above, and restores the i signal before the gamma correction. When the process in step S182 ends, the i signal decoding processing ends, and the processing returns to FIG. 13.

By executing each processing as described above, the distance measuring device 100 can suppress an increase in the load of processing of the sensing data.

Note that the i signal encoding processing executed by the encoding section 114 in step S110 of the distance measurement processing in FIG. 12 can be performed by a flow similar to the i signal encoding processing described with reference to the flowchart of FIG. 14. That is, the description with reference to the flowchart of FIG. 14 can also be applied to the i signal encoding processing of step S110.

Furthermore, the q signal processing executed by the signal processing section 108 to the decoding section 111 in step S105 of the distance measurement processing of FIG. 12 can be performed by a flow similar to the i signal processing described with reference to the flowchart of FIG. 13. That is, the description with reference to the flowchart of FIG. 13 can also be applied to the q signal processing of step S105.

However, in this case, the q signal is assumed as the processing target instead of the i signal. Furthermore, in a case of this q signal processing, in step S132, q signal encoding processing of encoding the q signal is executed instead of the i signal encoding processing. This q signal encoding processing can be performed by a flow similar to the i signal encoding processing described with reference to the flowchart of FIG. 14. That is, the description with reference to the flowchart of FIG. 14 can also be applied to the q signal encoding processing. However, in this case, the q signal is assumed as the processing target instead of the i signal. Similarly, in a case of the q signal processing, in step S136, q signal decoding processing of decoding the coded data of the q signal is executed instead of the i signal decoding processing. This q signal decoding processing can be performed by a flow similar to the i signal decoding processing described with reference to the flowchart of FIG. 15. That is, the description with reference to the flowchart of FIG. 15 can also be applied to the q signal decoding processing. However, in this case, the q signal is assumed as the processing target instead of the i signal.

Figure 12:
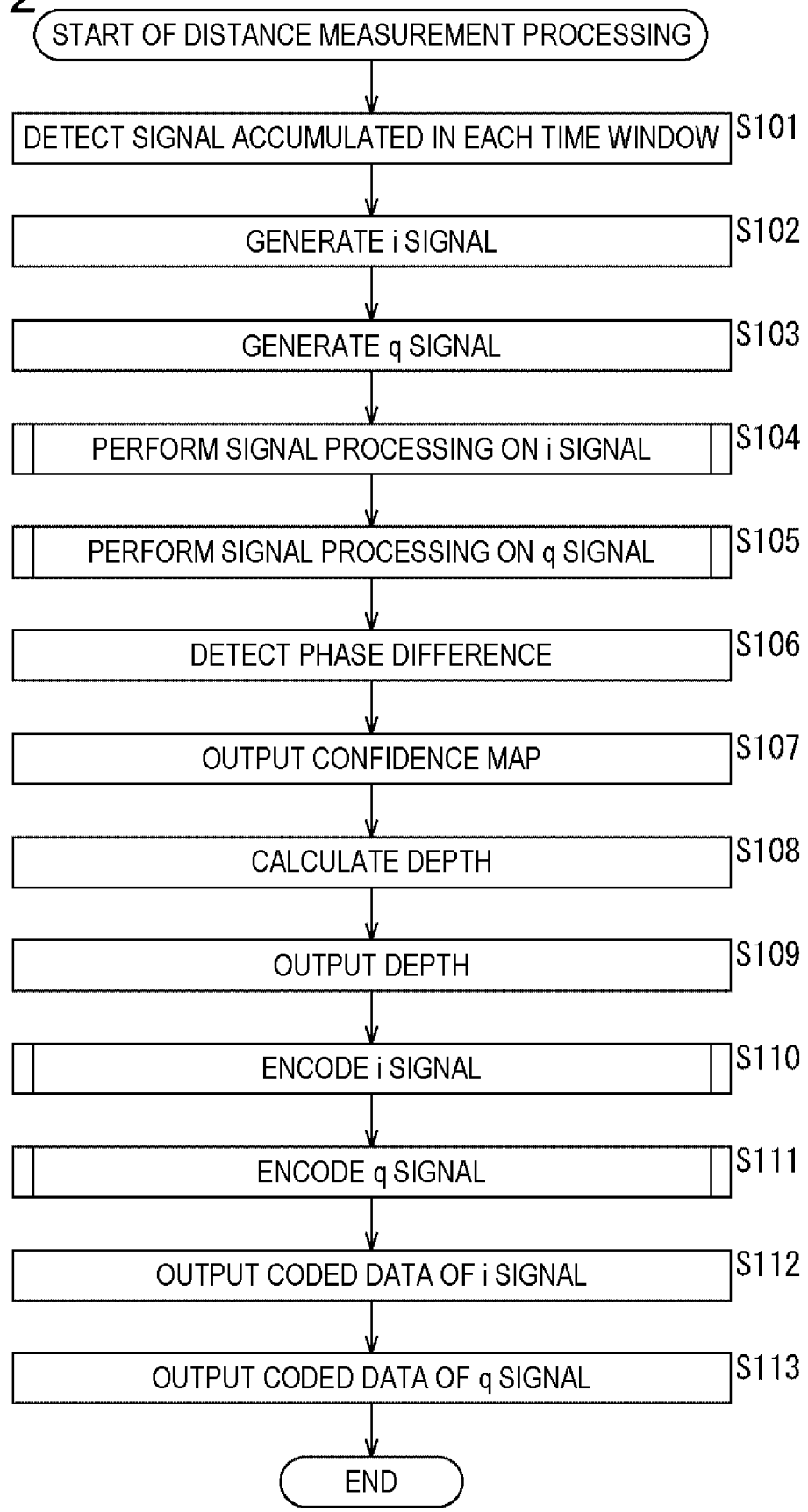
FIG. 12 is a flowchart depicting an example of a flow of distance measurement processing.

Furthermore, the q signal encoding processing executed by the encoding section 115 in step S111 of the distance measurement processing of FIG. 12 can be performed by a flow similar to the q signal encoding processing executed in step S132 of the q signal processing described above. That is, the description with reference to the flowchart of FIG. 14 can also be applied to the q signal encoding processing of step S111. However, in this case, the q signal is assumed as the processing target instead of the i signal.

3. Second Embodiment

<Distance Measuring Device>

In the first embodiment, it has been described that the i signal and the q signal, which are the intermediate data of the sensing data, are processed independently of each other, but without being limited thereto, the intermediate data of the sensing data may be processed as multidimensional vector data including both the i signal and the q signal. That is, the i signal and the q signal may be collectively processed into one signal.

Figure 16:
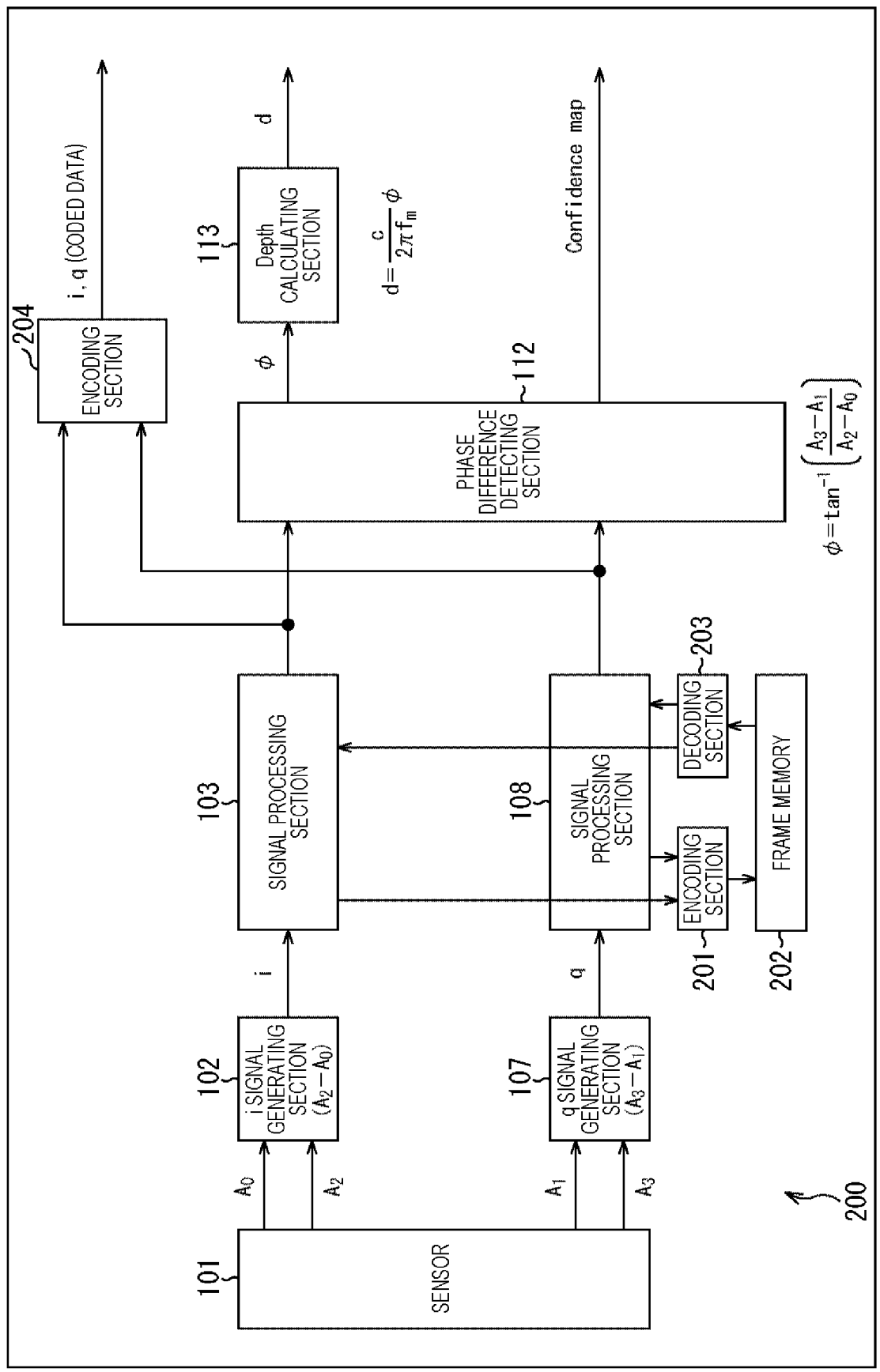
FIG. 16 is a block diagram depicting a main configuration example of the distance measuring device.

FIG. 16 is a block diagram depicting an example of a configuration of a distance measuring device that is an aspect of an information processing device to which the present technology is applied. A distance measuring device 200 depicted in FIG. 16 is a device that measures the distance to the subject by the indirect TOF method, similarly to the distance measuring device 100. However, in a case of the distance measuring device 200, as described above, the intermediate data of the sensing data is processed as multi-dimensional vector data including both the i signal and the q signal.

Note that while FIG. 16 depicts main elements such as processing sections and data flows, those depicted in FIG. 16 do not necessarily include all elements. That is, in the distance measuring device 200, a processing section not depicted as a block in FIG. 16 may exist, or a process or data flow not depicted as an arrow or the like in FIG. 16 may exist.

As depicted in FIG. 16, the distance measuring device 200 basically has a configuration similar to that of the distance measuring device 100. However, the distance measuring device 200 includes an encoding section 201, a frame memory 202, and a decoding section 203 instead of the encoding section 104 to the decoding section 106 and the encoding section 109 to the decoding section 111.

Moreover, the distance measuring device 200 includes an encoding section 204 instead of the encoding section 114 and the encoding section 115.

The encoding section 201 performs processing related to encoding of the i signal and the q signal. For example, the encoding section 201 acquires the i signal supplied from the signal processing section 103 and the q signal supplied from the signal processing section 108. Furthermore, the encoding section 201 encodes multidimensional vector data including these signals to generate coded data. Then, the encoding section 201 supplies the generated coded data (coded data corresponding to the i signal and the q signal) to the frame memory 202. That is, the encoding section 201 performs processing related to encoding of the multidimensional vector data including the i signal and the q signal to be stored in the frame memory 202.

Therefore, the encoding section 201 can obtain effects similar to those of the encoding section 104 and the encoding section 109.

The frame memory 202 includes a storage medium similar to the frame memory 105 and the frame memory 110, and performs processing related to storage of the i signal and the q signal. For example, the frame memory 202 acquires the coded data supplied from the encoding section 201 and stores the coded data in the storage medium. Furthermore, the frame memory 202 reads the coded data stored in the storage medium, and supplies the coded data to the decoding section 203. That is, the frame memory 202 stores the targets (i signal and q signal) of signal processing of the signal processing section 103 and the signal processing section 108. Note that the storage medium may be any storage medium, and may be, for example, a flash memory or a hard disk, or may be a removable medium that is detachable.

Therefore, the frame memory 202 can obtain effects similar to those of the frame memory 105 and the frame memory 110.

The decoding section 203 performs processing related to decoding of the coded data of the i signal and the q signal. For example, the decoding section 203 decodes the coded data of the multidimensional vector data including the i signal and the q signal supplied from the frame memory 202, and generates the i signal and the q signal. Then, the decoding section 203 supplies the generated i signal to the signal processing section 103 and supplies the generated q signal to the signal processing section 108. That is, the decoding section 203 performs processing related to decoding of the multidimensional vector data including the i signal and the q signal to be stored in the frame memory 202.

Therefore, the decoding section 203 can obtain effects similar to those of the decoding section 106 and the decoding section 111.

The encoding section 204 performs processing related to encoding of the i signal and the q signal, similarly to the encoding section 201. That is, the encoding section 204 has a configuration similar to that of the encoding section 201, and performs similar processing. In other words, the encoding section 204 encodes multidimensional vector data including the i signal supplied from the signal processing section 103 and the q signal supplied from the signal processing section 108, and generates the coded data. However, the encoding section 204 outputs the generated coded data to the outside of the distance measuring device 200. That is, the encoding section 204 performs processing related to encoding of the multidimensional vector data including the i signal and the q signal to be output to the outside of the distance measuring device 200.

Therefore, the encoding section 204 can obtain effects similar to those of the encoding section 114 and the encoding section 115.

That is, the distance measuring device 200 can suppress an increase in the load of processing of the sensing data.

Note that each of these processing sections of the distance measuring device 200 has an arbitrary configuration. For example, each processing section may be configured by a logic circuit that achieves the above-described processing. Furthermore, each processing section may include, for example, a CPU, a ROM, a RAM, and the like, and execute a program using them, to thereby implement the above-described processing. Of course, each processing section may have both the configurations, and a part of the above-described processing may be implemented by a logic circuit and the other may be implemented by executing a program. The configurations of the processing sections may be independent from each other, and for example, a part of the processing sections may implement a part of the above-described processing by a logic circuit, another part of the processing sections may implement the above-described processing by executing a program, and still another of the processing sections may implement the above-described processing by both the logic circuit and the execution of the program.

<Encoding Section>

Figure 17:
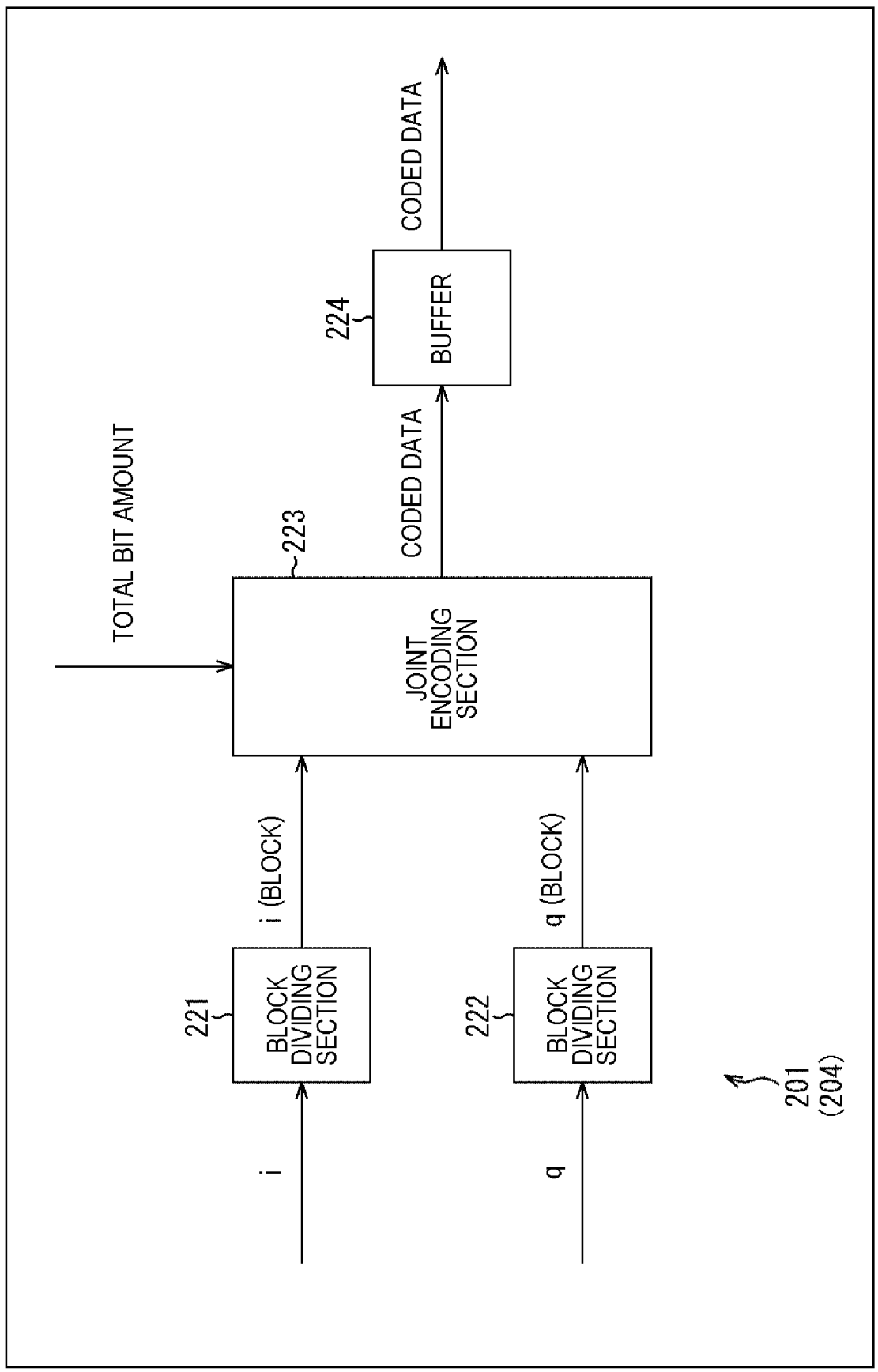
FIG. 17 is a block diagram depicting a main configuration example of the encoding section.

FIG. 17 is a block diagram depicting a main configuration example of the encoding section 201. Note that while FIG. 17 depicts main elements such as processing sections and data flows, those depicted in FIG. 17 do not necessarily include all elements. That is, in the encoding section 201, a processing section not depicted as a block in FIG. 17 may exist, or a process or data flow not depicted as an arrow or the like in FIG. 17 may exist.

As depicted in FIG. 17, the encoding section 201 includes a block dividing section 221, a block dividing section 222, a joint encoding section 223, and a buffer 224.

The block dividing section 221 acquires the i signal supplied from the signal processing section 103, divides the i signal into predetermined block units, and supplies the divided i signal to the joint encoding section 223. That is, the i signal is divided by the block dividing section 221 according to the input size to the joint encoding section 223. The block dividing section 222 acquires the q signal supplied from the signal processing section 108, divides the q signal into predetermined block units, and supplies the divided q signal to the joint encoding section 223. That is, the q signal is divided by the block dividing section 222 according to the input size to the joint encoding section 223.

The joint encoding section 223 performs processing related to encoding of the i signal and the q signal supplied in block units. For example, the joint encoding section 223 acquires the i signal in block units supplied from the block dividing section 221. Furthermore, the joint encoding section 223 acquires the q signal in block units supplied from the block dividing section 222. Moreover, the joint encoding section 223 acquires information designating a total bit amount (the total bit amount of the i signal and the q signal).

Then, the joint encoding section 223 encodes the acquired i signal and q signal in blocks so as to match a total bit amount designated from the outside, and generates one bit stream (coded data). The joint encoding section 223 supplies the generated coded data to the buffer 224.

The buffer 224 temporarily holds the coded data supplied from the joint encoding section 223, smooths the bit rate, and outputs the data. Note that, for example, in a case where the joint encoding section 223 can generate coded data so that the bit rate accurately matches the specified total bit amount, the buffer 224 may be omitted.

Note that the encoding section 204 also has a configuration similar to that of the encoding section 201. That is, the configuration example depicted in FIG. 17 can also be applied to the encoding section 204. However, in a case of the encoding section 204, the coded data output from the buffer 224 is output to the outside of the distance measuring device 200.

<Joint Encoding Section>

Figure 18:
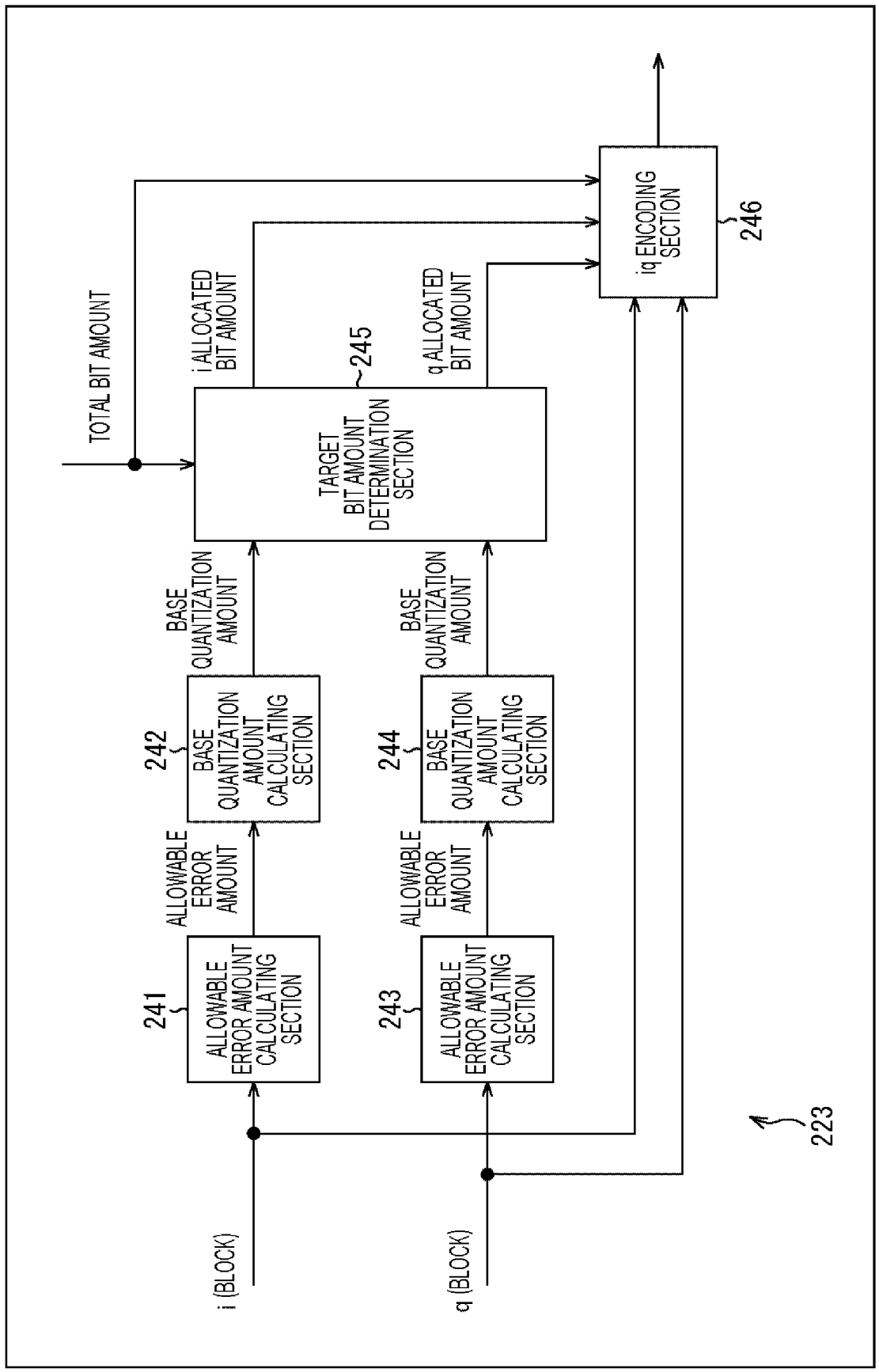
FIG. 18 is a block diagram depicting a main configuration example of a joint encoding section.

FIG. 18 is a block diagram depicting a main configuration example of the joint encoding section 223. Note that while FIG. 18 depicts main elements such as processing sections and data flows, those depicted in FIG. 18 do not necessarily include all elements. That is, in the joint encoding section 223, a processing section not depicted as a block in FIG. 18 may exist, or a process or data flow not depicted as an arrow or the like in FIG. 18 may exist.

As depicted in FIG. 18, the joint encoding section 223 includes an allowable error amount calculating section 241, a base quantization amount calculating section 242, an allowable error amount calculating section 243, a base quantization amount calculating section 244, a target bit amount determination section 245, and an iq encoding section 246.

The allowable error amount calculating section 241 calculates an allowable error amount (also referred to as an allowable error amount) for the supplied i signal. The allowable error amount calculating section 241 supplies the calculated allowable error amount of the i signal to the base quantization amount calculating section 242.

The base quantization amount calculating section 242 calculates the base quantization amount of each pixel on the basis of the supplied allowable error amount. For example, the base quantization amount calculating section 242 calculates the base quantization amount base q step by rounding down the allowable error amount to a predetermined value or less using the floor function as in the following expression (14).

$$\text{base } q \text{ setep} = \text{floor}(\log_2 \text{ allowable error amount}) \qquad (14)$$

The base quantization amount calculating section 242 supplies the calculated base quantization amount for the i signal to the target bit amount determination section 245.

The allowable error amount calculating section 243 performs processing similar to that of the allowable error amount calculating section 241 on the supplied q signal. The base quantization amount calculating section 244 performs processing similar to that of the base quantization amount calculating section 242, calculates the base quantization amount for the q signal, and supplies the calculated base quantization amount to the target bit amount determination section 245.

The target bit amount determination section 245 determines an allocated bit amount of the i signal and an allocated bit amount of the q signal as the target bit amount on the basis of the base quantization amount for each of the i signal and the q signal supplied in this manner and the total bit amount designated from the outside. The target bit amount determination section 245 supplies the determined information indicating the allocated bit amount of the i signal and information indicating the allocated bit amount of the q signal to the iq encoding section 246.

Figure 19:
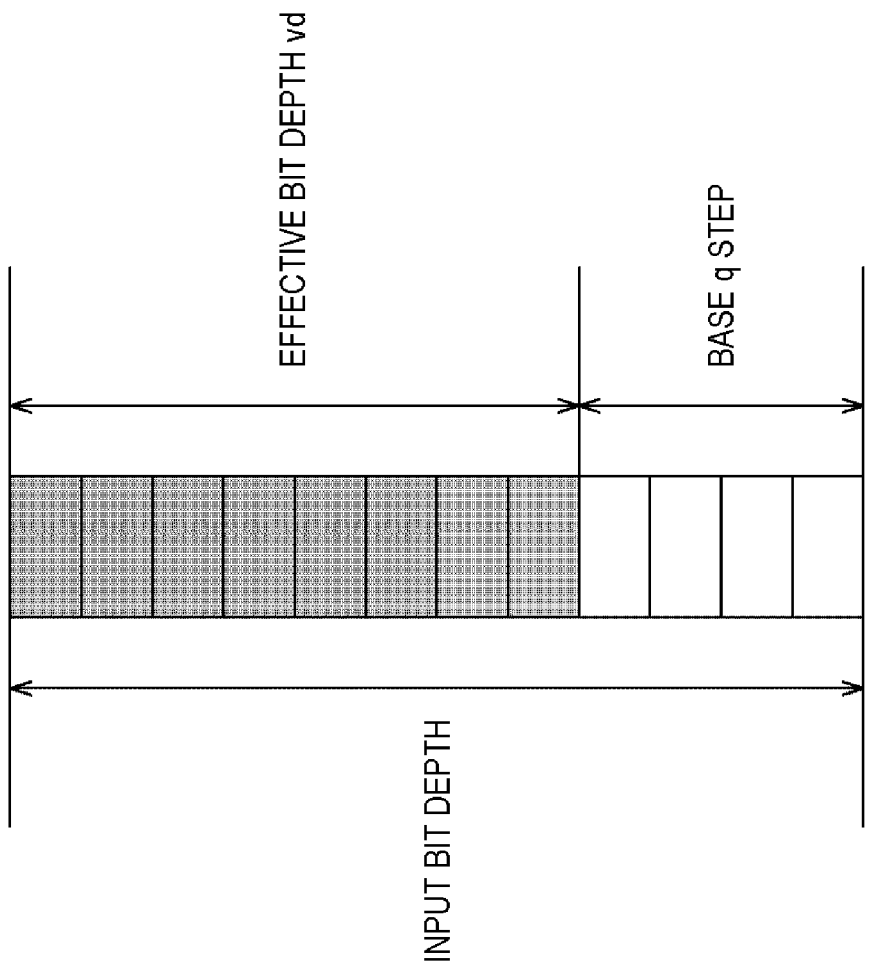
FIG. 19 is a diagram depicting an example of bit allocation.

For example, as depicted in FIG. 19, the target bit amount determination section 245 calculates an effective bit depth vd of each of the i signal and the q signal. For example, the effective bit depth vd is calculated using the following Expressions (15) and (16).

[Expression 14]

$$\text{rate}_i = \frac{vd_i}{vd_i + vd_q} \times (\text{total bit} - \text{header bit}) \quad (15)$$

[Expression 15]

$$\text{rate}_q = \frac{vd_q}{vd_i + vd_q} \times (\text{total bit} - \text{header bit}) \quad (16)$$

The iq encoding section 246 acquires the i signal and the q signal for each block supplied to the joint encoding section 223. Furthermore, the iq encoding section 246 corrects each of the bit depths of the i signal and the q signal on the basis of the allocated bit amount of the i signal and the allocated bit amount of the q signal determined by the target bit amount determination section 245, and the total bit amount designated from the outside, and combines the i signal and the q signal to encode them as one piece of data, thereby generating coded data. The iq encoding section 246 supplies the generated coded data to the buffer 224.

The configuration of the iq encoding section 246 is arbitrary. For example, the iq encoding section 246 may have a configuration similar to that of the encoding section 104 (FIG. 5). In this case, the intermediate data of the sensing data to be the processing target of encoding is the multidimensional vector data including both the i signal and the q signal. That is, the sensing gamma correcting section 131 corrects the bit depth of the multidimensional vector data including both the i signal and the q signal, and the encoding section 132 encodes the multidimensional vector data with the bit depth corrected and generates coded data. As described above, the correction of the bit depth at that time is performed on the basis of the allocated bit amount of the i signal and the allocated bit amount of the q signal determined by the target bit amount determination section 245, and the total bit amount designated from the outside.

<Decoding Section>

Figure 20:
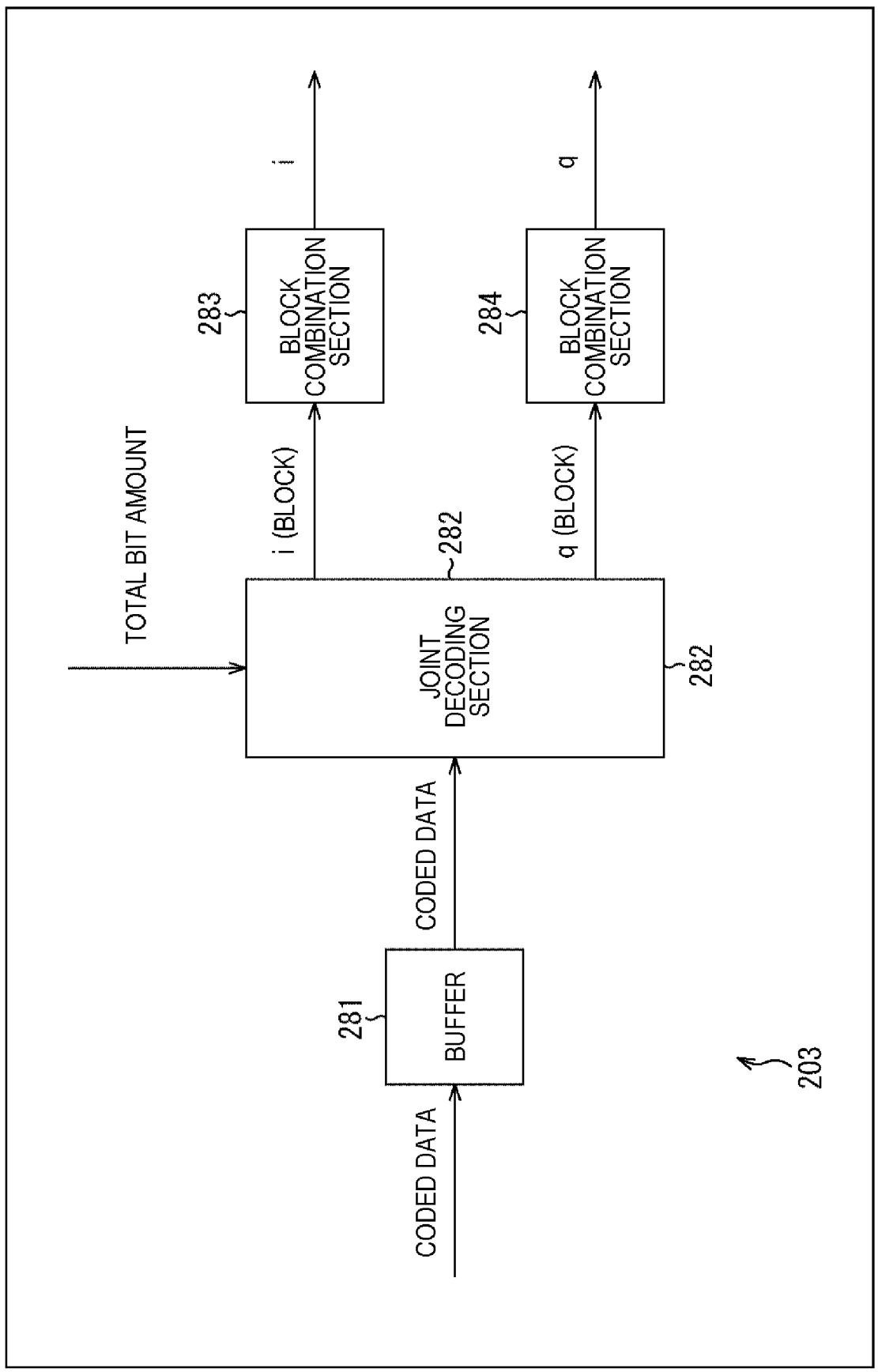
FIG. 20 is a block diagram depicting a main configuration example of a decoding section.

FIG. 20 is a block diagram depicting a main configuration example of the decoding section 203. Note that while FIG. 20 depicts main elements such as processing sections and data flows, those depicted in FIG. 20 do not necessarily include all elements. That is, in the decoding section 203, a processing section not depicted as a block in FIG. 20 may exist, or a process or data flow not depicted as an arrow or the like in FIG. 20 may exist.

As depicted in FIG. 20, the decoding section 203 includes a buffer 281, a joint decoding section 282, a block combination section 283, and a block combination section 284.

The buffer 281 holds the coded data read from the frame memory 202, smooths the bit rate, and supplies the data to the joint decoding section 282. Note that in a case where the bit rate of the coded data is smoothed and supplied to the decoding section 203, this buffer 281 may be omitted.

The joint decoding section 282 decodes coded data, and extracts the i signal and the q signal for each block from decoded data thereof on the basis of a total bit amount designated from the outside, an allocated bit amount of the i signal, an allocated bit amount of the q signal, and the like. The joint decoding section 282 supplies the extracted i signal to the block combination section 283. Furthermore, the joint decoding section 282 supplies the extracted q signal to the block combination section 284.

The block combination section 283 combines the supplied i signal for each block, and supplies the combined i signal to the signal processing section 103. Furthermore, the block combination section 284 combines the supplied q signals for each block, and supplies the combined q signals to the signal processing section 108.

That is, the decoding section 203 performs inverse processing of the encoding section 201.

<Flow of Distance Measurement Processing>

Figure 21:
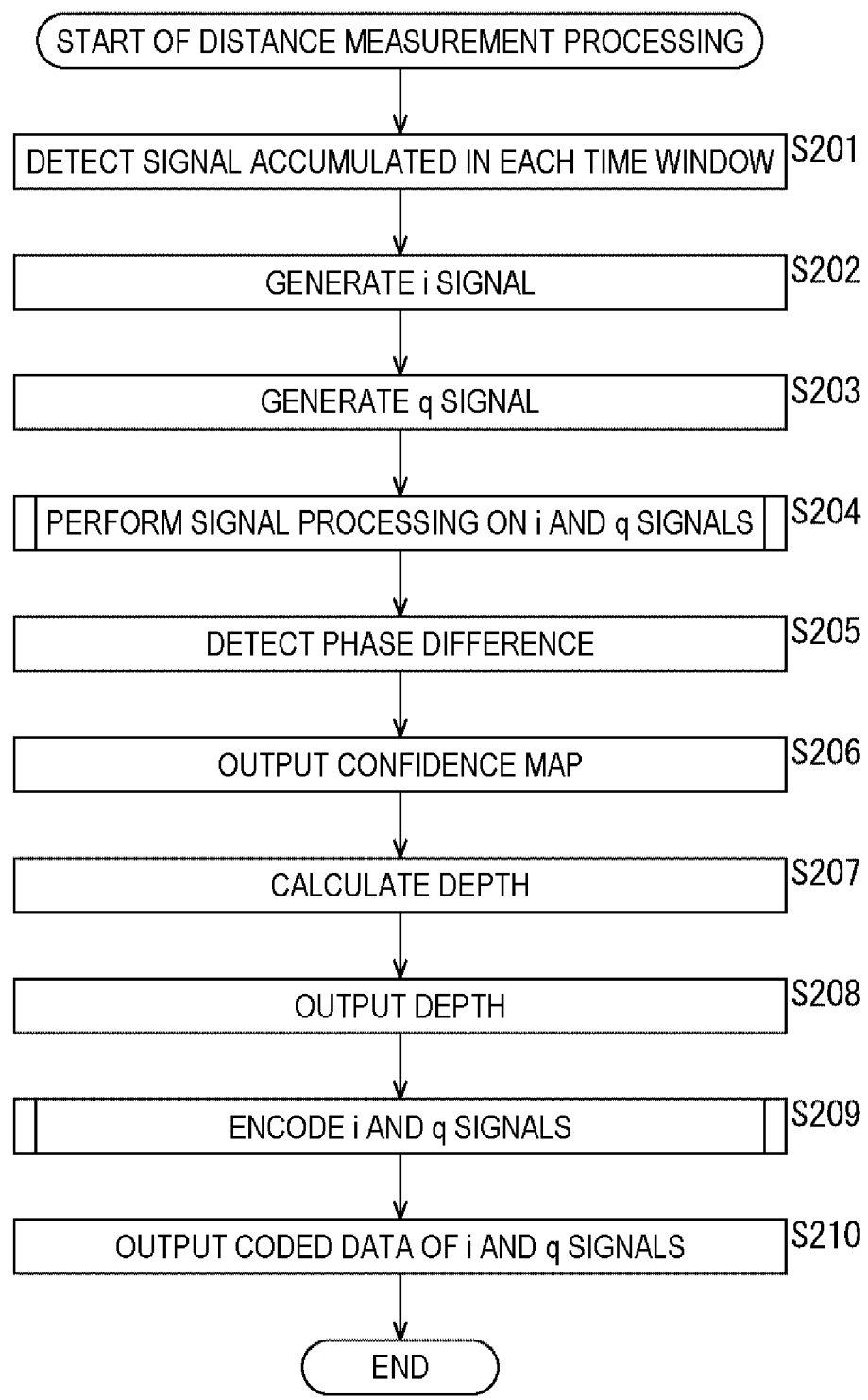
FIG. 21 is a flowchart depicting an example of a flow of the distance measurement processing.

An example of a flow of distance measurement processing executed by the distance measuring device 200 in this case will be described with reference to a flowchart of FIG. 21. When the distance measurement processing is started, respective processes in steps S201 to S203 are executed similarly to respective processes in steps S101 to S103 in FIG. 12.

In step S204, the signal processing section 103, the signal processing section 108, and the encoding section 201 to the decoding section 203 execute iq signal processing, and perform signal processing on both the i signal generated in step S202 and the q signal generated in step S203.

Respective processes in steps S205 to S208 are executed similarly to the respective processes in steps S106 to S109 of the imaging process in FIG. 12.

In step S209, the encoding section 204 executes the iq signal encoding processing and generates coded data of multidimensional vector data including both the i signal and the q signal. Then, in step S210, the encoding section 204 outputs the coded data generated in step S209 to the outside of the distance measuring device 200. Note that the output of the coded data can be omitted. In that case, these processes can be omitted.

When the process in step S210 ends, the distance measurement processing ends.

<Flow of iq Signal Processing>

Next, an example of a flow of the iq signal processing executed in step S204 of FIG. 21 will be described with reference to a flowchart of FIG. 22. When the iq signal processing is started, the signal processing section 103 and the signal processing section 108 determine whether or not to store the i signal and the q signal in step S231. In a case where it is determined to store the i signal and the q signal, the processing proceeds to step S232. In step S232, the encoding section 201 executes iq signal encoding processing and encodes the i signal and the q signal to generate coded data. In step S233, the frame memory 202 stores the coded data of the multidimensional vector data including both the i signal and the q signal generated in step S232. When the process in step S233 ends, the processing proceeds to step S234. Furthermore, in a case where it is determined not to store the i signal and the q signal in step S231, the processing proceeds to step S234.

In step S234, the signal processing section 103 and the signal processing section 108 determine whether or not to read the i signal and the q signal. In a case where it is determined to read the i signal and the q signal, the processing proceeds to step S235. In step S235, the frame memory 202 reads the coded data of the multidimensional vector data including both the requested i signal and q signal. In step S236, the decoding section 203 performs iq signal decoding processing, and decodes the coded data to generate an i signal and a q signal. When the process in step S236 ends, the processing proceeds to step S237. Furthermore, in a case where it is determined not to read the i signal and the q signal in step S234, the processing proceeds to step S237.

In step S237, the signal processing section 103 and the signal processing section 108 determine whether or not to perform signal processing on the i signal and the q signal. In a case where it is determined to perform the signal processing, the processing proceeds to step S238. In step S238, the signal processing section 103 performs the signal processing on the i signal. In step S239, the signal processing section 108 performs the signal processing on the q signal. When the process in step S239 ends, the processing proceeds to step S240. Furthermore, in a case where it is determined not to perform the signal processing in step S237, the processing proceeds to step S240.

In step S240, the signal processing section 103 and the signal processing section 108 determine whether or not to end the signal processing. In a case where it is determined not to end the signal processing due to the presence of unprocessed data or unexecuted signal processing, or the like, the processing returns to step S231, and the subsequent processing is repeated. Furthermore, in a case where it is determined to end the signal processing in step S240 by performing all the processes and the like, the processing proceeds to step S241.

In step S241, the signal processing section 103 supplies the i signal on which the signal processing has been appropriately performed to the phase difference detecting section 112, and the signal processing section 108 supplies the q signal on which the signal processing has been appropriately performed to the phase difference detecting section 112. When the process in step S241 ends, the iq signal processing ends, and the processing returns to FIG. 21.

Figure 22:
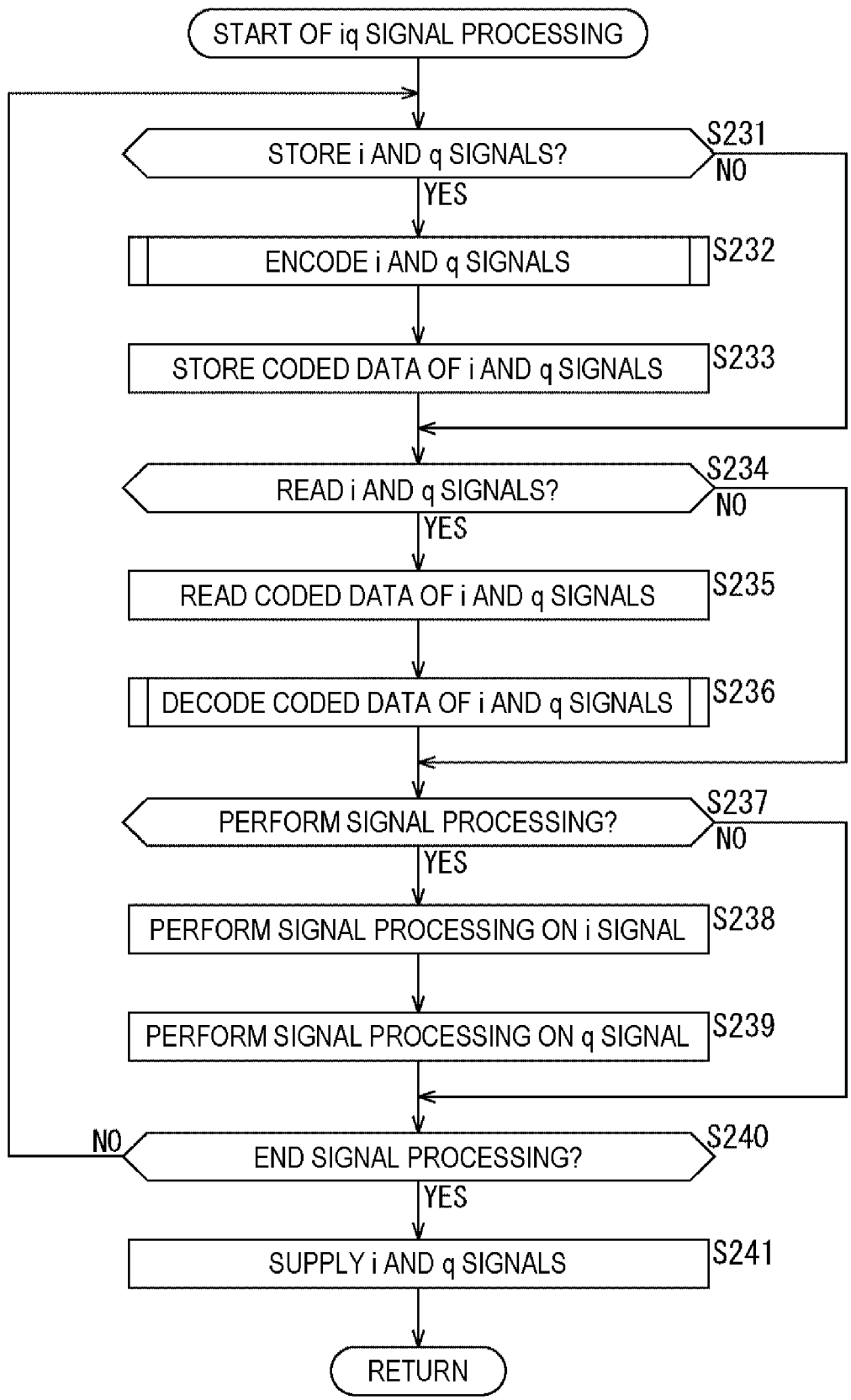
FIG. 22 is a flowchart depicting an example of a flow of iq signal processing.

Note that, in this iq signal processing, the processing order of the processing group of steps S231 to S233, the processing group of steps S234 to S236, and the processing group of steps S237 to S239 is arbitrary, and is not limited to the example of FIG. 22. For example, after the processing of steps S237 to S239 is performed, the processing of steps S231 to S233 and the processing of steps S234 to S236 may be performed. Furthermore, other orders may be used. That is, writing and reading of the i signal and the q signal can be performed at any timing of signal processing.

<Flow of iq Signal Encoding Processing>

Figure 23:
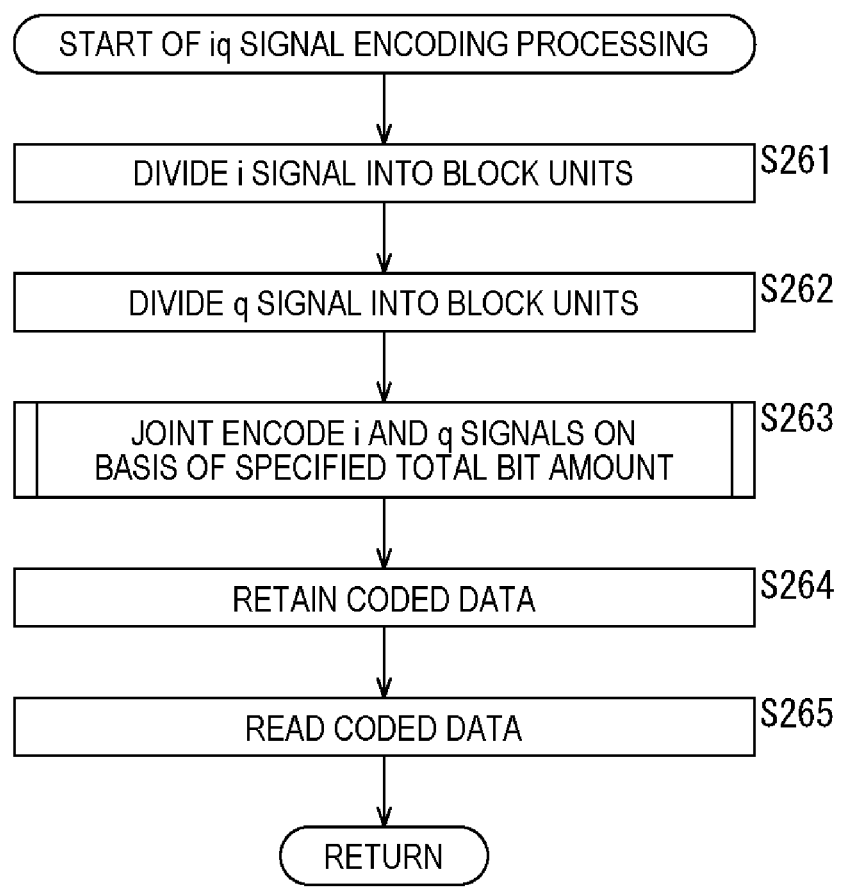
FIG. 23 is a flowchart depicting an example of a flow of iq signal encoding processing.

Next, an example of a flow of the iq signal encoding processing executed in step S232 and the like of FIG. 22 will be described with reference to a flowchart of FIG. 23.

When the iq signal encoding processing is started, the block dividing section 221 of the encoding section 201 divides the i signal into block units in step S261. In step S262, the block dividing section 222 divides the q signal into block units.

In step S263, the joint encoding section 223 executes joint encoding processing, joint encodes the i signal and the q signal on the basis of the designated total bit amount, and generates coded data of the multidimensional vector data including both the i signal and the q signal.

In step S264, the buffer 224 holds the coded data generated in step S263. In step S265, the buffer 224 reads the coded data so that the bit rate is smoothed, and outputs the coded data to the outside of the distance measuring device 200. When the process in step S265 ends, the iq signal encoding processing ends, and the processing returns to FIG. 22.

<Flow of Joint Encoding Processing>

Figure 24:
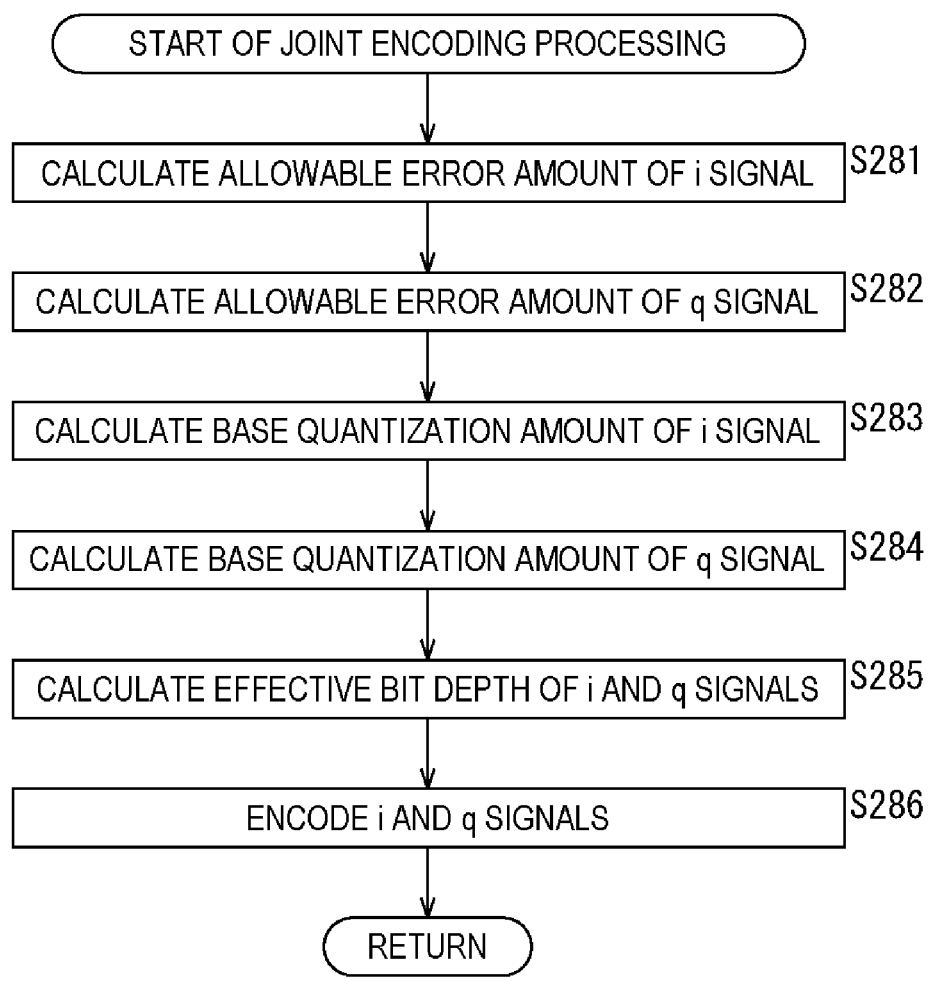
FIG. 24 is a flowchart depicting an example of a flow of joint encoding processing.

Next, an example of a flow of joint encoding processing executed in step S263 in FIG. 23 will be described with reference to a flowchart of FIG. 24.

When the joint encoding processing is started, the allowable error amount calculating section 241 calculates the allowable error amount of the i signal in step S281. In step S282, the allowable error amount calculating section 243 calculates the allowable error amount of the q signal.

In step S283, the base quantization amount calculating section 242 calculates the base quantization amount of the i signal. In step S284, the base quantization amount calculating section 244 calculates the base quantization amount of the q signal. In step S285, the target bit amount determination section 245 calculates the allocated bit amount (effective bit depth) of each of the i signal and the q signal.

In step S286, the iq encoding section 246 encodes the i signal and the q signal on the basis of these pieces of information, and generates coded data of the multidimensional vector data including both the i signal and the q signal. When the process in step S286 ends, the iq signal encoding processing ends, and the processing returns to FIG. 23.

<Flow of Iq Signal Decoding Processing>

Figure 25:
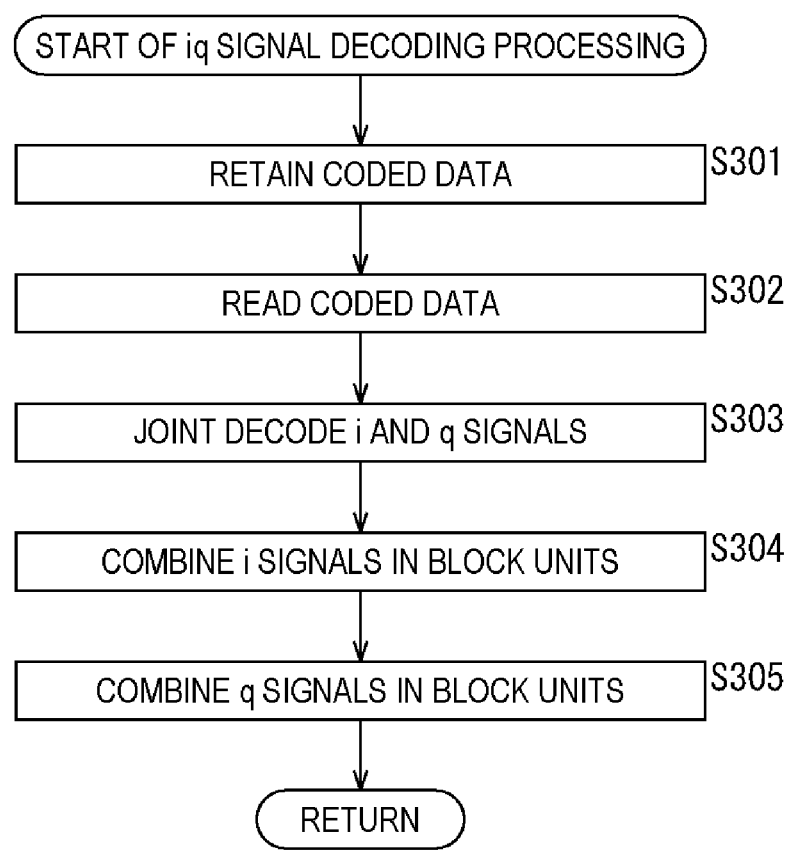
FIG. 25 is a flowchart depicting an example of a flow of iq signal decoding processing.

Next, an example of a flow of the iq signal decoding processing executed in step S236 and the like of FIG. 22 will be described with reference to a flowchart of FIG. 25.

When the iq signal decoding processing is started, the buffer 281 of the decoding section 203 holds supplied coded data in step S301. In step S302, the buffer 281 reads the coded data so that the bit rate is smoothed.

In step S303, the joint decoding section 282 joint decodes the coded data to generate the i signals in block units and the q signals in block units.

In step S304, the block combination section 283 combines the i signals in block units generated in step S303. In step S305, the block combination section 284 combines the q signals in block units generated in step S303.

When the i signal and the q signal are generated as described above, the iq signal decoding processing ends, and the processing returns to FIG. 22.

By executing each processing as described above, the distance measuring device 200 can suppress an increase in the load of processing of the sensing data.

4. Third Embodiment

<Distance Measuring System>

In the above description, it has been described that the bit depth is corrected at the time of encoding and the reverse processing (inverse correction of the bit depth) is performed at the time of decoding, but without being limited thereto, for example, inverse processing (inverse correction of the bit depth) at the time of decoding can be omitted.

Figure 26:
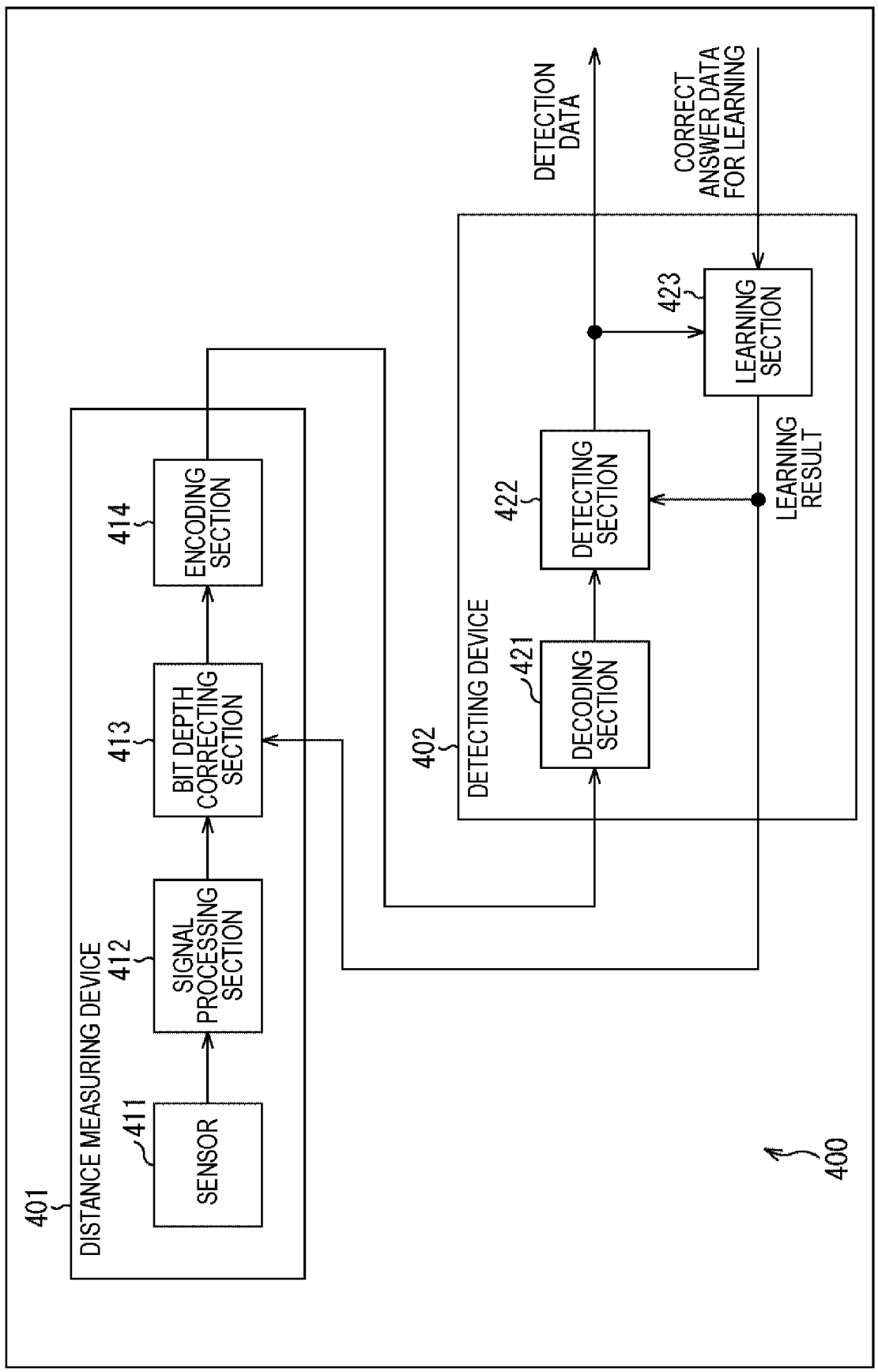
FIG. 26 is a block diagram depicting a main configuration example of a distance measuring system.

FIG. 26 is a block diagram depicting an example of a configuration of a distance measuring system that is an aspect of an information processing system to which the present technology is applied. A distance measuring system 400 depicted in FIG. 26 is a system in which a distance to a subject is measured by the indirect TOF method, and processing is performed on the basis of the measurement result.

Note that while FIG. 26 depicts main elements such as processing sections and data flows, those depicted in FIG. 26 do not necessarily include all elements. That is, in the distance measuring system 400, a processing section not depicted as a block in FIG. 26 may exist, or a process or data flow not depicted as an arrow or the like in FIG. 26 may exist.

As depicted in FIG. 26, the distance measuring system 400 includes a distance measuring device 401 and a detecting device 402. Similarly to the distance measuring device 100 and the distance measuring device 200, the distance measuring device 401 is a device that measures the distance to the subject by the indirect TOF method. The distance measuring device 401 supplies a distance measurement result (for example, depth data or the like) thereof to the detecting device 402. The detecting device 402 is a device that detects a desired subject on the basis of the distance measurement result. The detecting device 402 outputs detection data including a detection result thereof. Note that the detecting device 402 performs learning (for example, machine learning) regarding the detection of the subject and performs processing on the basis of a learning result thereof.

The distance measuring device 401 includes a sensor 411, a signal processing section 412, a bit depth correcting section 413, and an encoding section 414. The sensor 411 is a sensor similar to the sensor 101, the i signal generating section 102, and the q signal generating section 107, performs similar processing, and generates an i signal and a q signal that are intermediate data of the sensing data. The signal processing section 412 is a processing section similar to the signal processing section 103 and the signal processing section 108, performs similar processing, and performs signal processing on the i signal and the q signal independently of each other.

The bit depth correcting section 413 is a processing section similar to the sensing gamma correcting section 131, and performs similar processing to correct the bit depths of the i signal and the q signal. Note that the bit depth correcting section 413 may process the i signal and the q signal independently of each other, or may process the i signal and the q signal as the multidimensional vector data including both the i signal and the q signal.

The encoding section 414 is a processing section similar to the encoding section 132, and performs similar processing to encode the i signal and the q signal and generate the coded data. Note that the encoding section 414 may process the i signal and the q signal independently of each other, or may process the i signal and the q signal as the multidimensional vector data including both the i signal and the q signal.

The coded data generated by the encoding section 414 is supplied to the detecting device 402.

The detecting device 402 includes a decoding section 421, a detecting section 422, and a learning section 423. The decoding section 421 decodes the coded data supplied from the distance measuring device 401, generates the i signal and the q signal before the inverse correction of the bit depth is performed, and supplies the i signal and the q signal to the detecting section 422.

The detecting section 422 detects the desired subject using the i signal and the q signal before the inverse correction of the bit depth is performed on the basis of the learning result supplied from the learning section 423, and outputs detection data including a detection result thereof.

The learning section 423 performs learning for detecting the desired subject from the i signal and the q signal before inverse correction of the bit depth is performed. For example, the learning section 423 acquires the i signal and the q signal before the inverse correction of the bit depth is performed, the detection result, the correct answer data for learning, and the like, and performs learning of subject detection on the basis of these pieces of data. Then, the learning section 423 supplies a learning result thereof to the detecting section 422.

As described above, the detecting section 422 performs the detection on the basis of the learning result. In a case where the learning result is used in this manner, for example, if the value is uniquely determined before and after the corrector as in the gamma curve, it is also possible to detect from the signal before the inverse correction by performing machine learning using the signal before the inverse correction. That is, inverse correction of the bit depth becomes unnecessary, and an increase in the load can be suppressed.

Note that, in a case where learning is performed in advance, the learning section 423 can be omitted.

Furthermore, the bit depth correcting section 413 may perform correction of the bit depth of the i signal or q signal at the time of encoding using the learning result. For example, in FIG. 26, a learning result derived by the learning section 423 may be fed back to the bit depth correcting section 413. For example, the learning section 423 may perform learning of the correction of the bit depth so as to suppress the influence of the correction of the bit depth at the time of encoding on the detection processing in the detecting section 422, and feed back a learning result thereof to the bit depth correcting section 413. Then, the bit depth correcting section 413 may correct the bit depth of the i signal or q signal using the learning result.

In this manner, the bit depth correcting section 413 can perform correction of the bit depth so as to further reduce the influence on the subsequent processing.

Note that each of these processing sections of the distance measuring device 401 and the detecting device 402 has an arbitrary configuration. For example, each processing section may be configured by a logic circuit that achieves the above-described processing. Furthermore, each processing section may include, for example, a CPU, a ROM, a RAM, and the like, and execute a program using them, to thereby implement the above-described processing. Of course, each processing section may have both the configurations, and a part of the above-described processing may be implemented by a logic circuit and the other may be implemented by executing a program. The configurations of the processing sections may be independent from each other, and for example, a part of the processing sections may implement a part of the above-described processing by a logic circuit, another part of the processing sections may implement the above-described processing by executing a program, and still another of the processing sections may implement the above-described processing by both the logic circuit and the execution of the program.

<Flow of Distance Measurement Processing>

Figure 27:
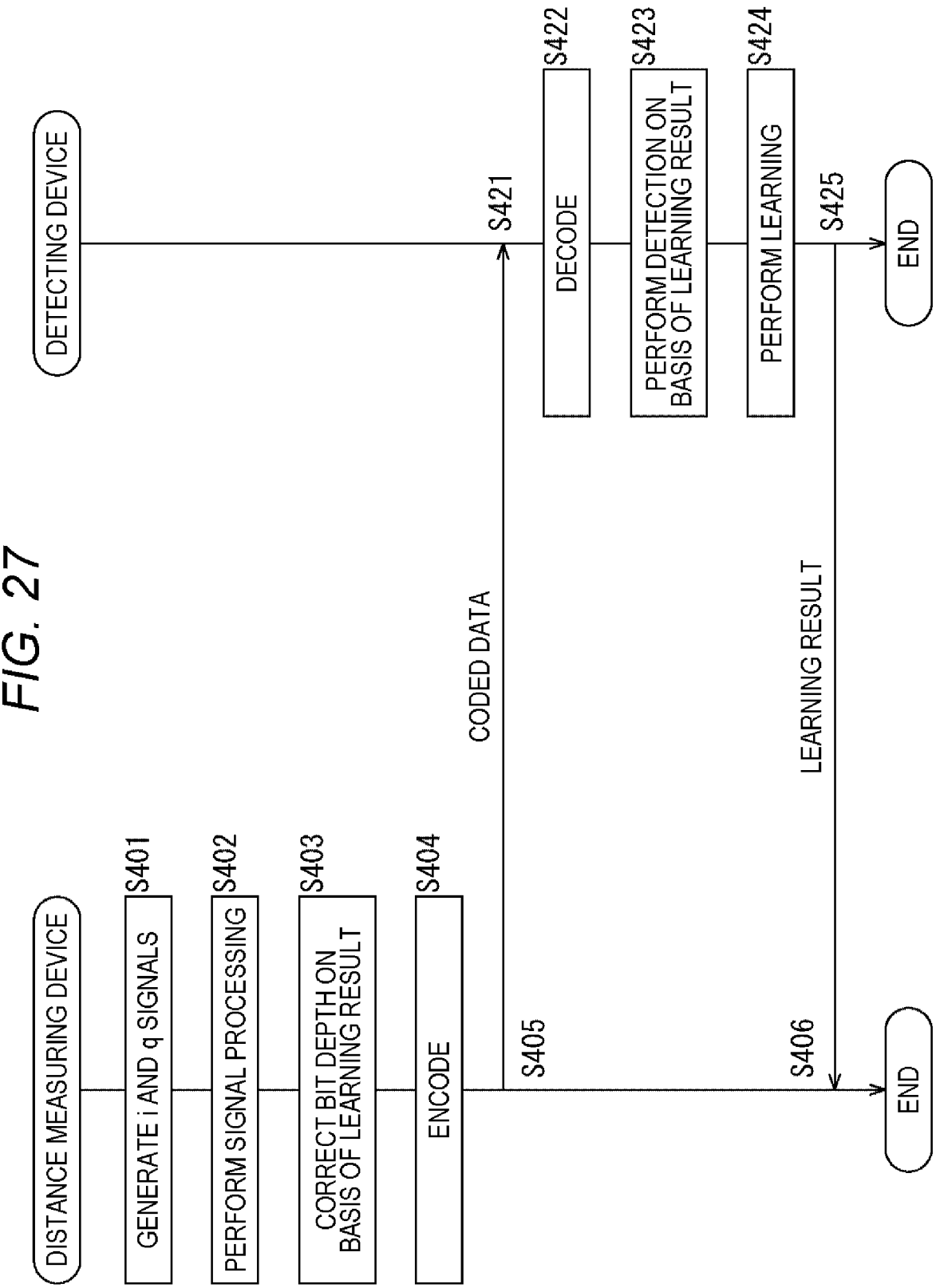
FIG. 27 is a flowchart depicting an example of a flow of the distance measurement processing.

An example of a flow of distance measurement processing executed by (each device of) the distance measuring system 400 will be described with reference to a flowchart of FIG. 27.

For example, the sensor 411 of the distance measuring device 401 generates the i signal and the q signal in step S401. In step S402, the signal processing section 412 performs the signal processing on the i signal and the q signal.

In step S403, the bit depth correcting section 413 corrects the bit depths of the i signal and the q signal on the basis of the fed back learning result. In step S404, the encoding section 414 encodes the i signal and the q signal with the bit depths corrected and generates coded data. The encoding section 414 transmits the generated coded data to the detecting device 402.

In step S421, the decoding section 421 of the detecting device 402 receives the coded data. In step S422, the decoding section 421 decodes the coded data, and generates the i signal and the q signal in a state before the bit depth is inversely corrected.

In step S423, the detecting section 422 detects the desired subject or the like using the i signal and the q signal in a state before the bit depth is inversely corrected on the basis of the learning result fed back from the learning section 423, and outputs the detection data.

In step S424, the learning section 424 performs learning of the detection and feeds back a learning result thereof to the detecting section 422.

Furthermore, in step S425, the learning section 424 transmits the learning result to the distance measuring device 401. In step S406, the bit depth correcting section 413 of the distance measuring device 401 receives the learning result.

By executing each processing as described above, the distance measuring device 401 and the detecting device 402 can suppress an increase in the load of processing of the sensing data.

5. Fourth Embodiment

<Distance Measuring Device>

Figure 28:
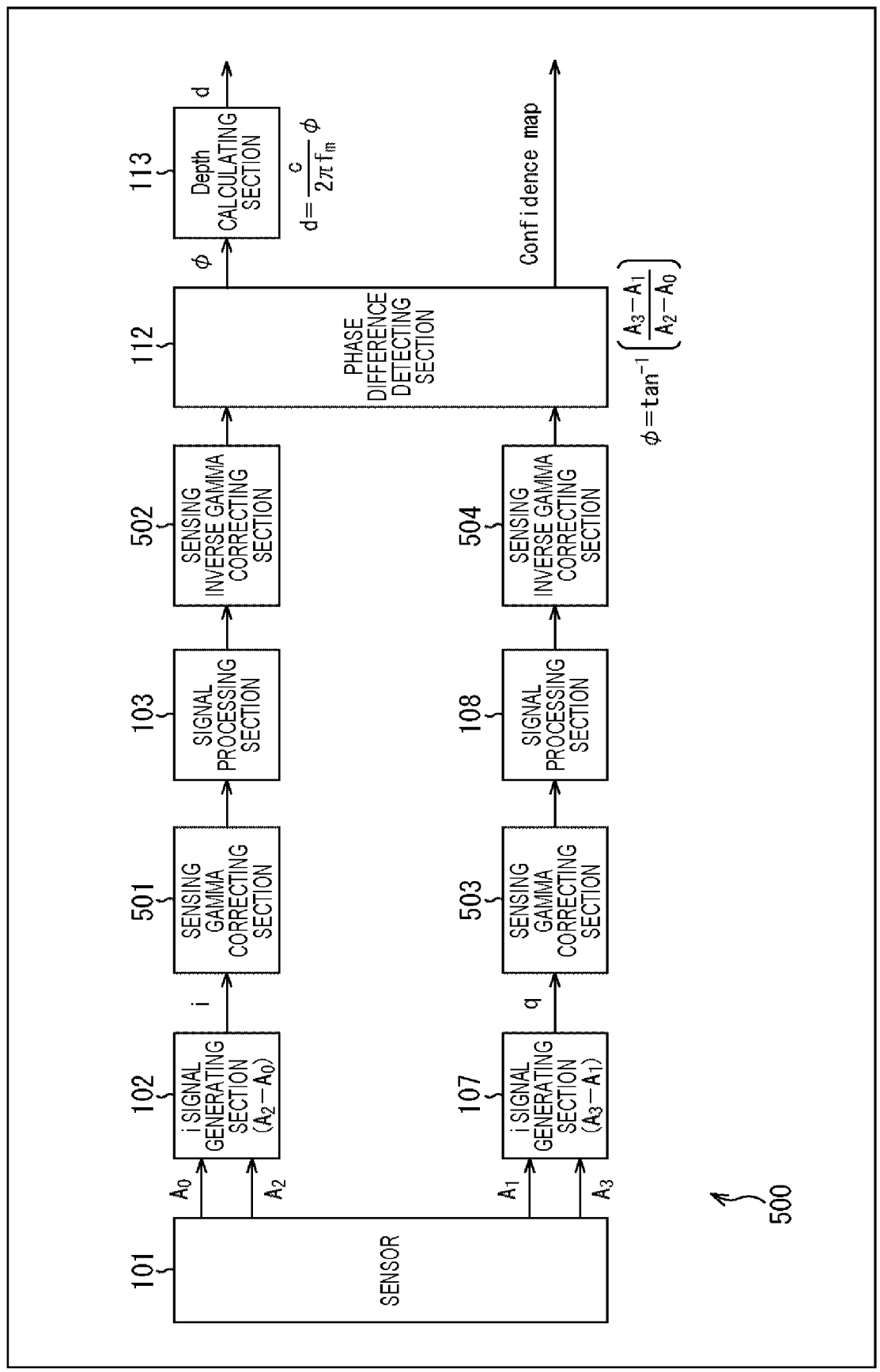
FIG. 28 is a block diagram depicting a main configuration example of the distance measuring device.

FIG. 28 is a block diagram depicting an example of a configuration of a distance measuring device that is an aspect of an information processing device to which the present technology is applied. A distance measuring device 500 depicted in FIG. 28 is a device that measures the distance to the subject by the indirect TOF method, similarly to the distance measuring device 100.

However, the distance measuring device 500 performs correction of the bit depth before and after the signal processing. As depicted in FIG. 28, the distance measuring device 500 includes a sensor 101, an i signal generating section 102, a sensing gamma correcting section 501, a signal processing section 103, a sensing inverse gamma correcting section 502, a q signal generating section 107, a sensing gamma correcting section 503, a signal processing section 108, a sensing inverse gamma correcting section 504, a phase difference detecting section 112, and a depth calculating section 113.

The sensing gamma correcting section 501 is a processing section similar to the sensing gamma correcting section 131, and performs similar processing. For example, the sensing gamma correcting section 501 acquires the i signal supplied from the i signal generating section 102, corrects the bit depth of the i signal, and supplies the corrected i signal to the signal processing section 103.

The signal processing section 103 acquires the corrected i signal supplied from the sensing gamma correcting section 501 and performs signal processing.

In this manner, the signal processing section 103 can perform signal processing on the i signal in the state where the bit depth is reduced. Therefore, it is possible to suppress an increase in the load of the signal processing section 103. However, in this case, the i signal to be the signal processing target becomes nonlinear. Therefore, the signal processing section 103 may perform signal processing that is less affected by a linearity of the input data. For example, the signal processing section 103 can perform processing such as noise reduction.

The sensing inverse gamma correcting section 502 acquires the i signal on which the signal processing has been appropriately performed in the signal processing section 103, inversely corrects the bit depth, and returns the signal to the linear signal. The sensing inverse gamma correcting section 502 supplies the i signal returned to the original bit depth by the inverse correction to the phase difference detecting section 112.

By performing the inverse correction in this manner, signal processing that is greatly affected by the linearity of the input data can also be performed after the inverse correction.

The sensing gamma correcting section 503 performs processing similar to that of the sensing gamma correcting section 501 on the q signal. That is, the sensing gamma correcting section 501 corrects the bit depth of the q signal as the target of the signal processing of the signal processing section 108.

In this manner, the signal processing section 108 can perform signal processing on the q signal in the state where the bit depth is reduced. Therefore, it is possible to suppress an increase in the load of the signal processing section 108. However, in this case, the q signal to be the signal processing target becomes nonlinear. Therefore, the signal processing section 108 may perform signal processing that is less affected by the linearity of the input data. For example, the signal processing section 108 can perform processing such as noise reduction.

The sensing inverse gamma correcting section 504 performs processing similar to that of the sensing inverse gamma correcting section 502 on the q signal. That is, the sensing inverse gamma correcting section 504 acquires the q signal on which the signal processing has been appropriately performed in the signal processing section 108, inversely corrects the bit depth thereof, and returns the signal to the linear signal. The sensing inverse gamma correcting section 504 supplies the q signal returned to the original bit depth by the inverse correction to the phase difference detecting section 112.

By performing the inverse correction in this manner, signal processing that is greatly affected by the linearity of the input data can also be performed after the inverse correction.

With the above configuration, the distance measuring device 500 can suppress an increase in calculation cost and mounting cost related to signal processing.

Note that each of these processing sections of the distance measuring device 500 has an arbitrary configuration. For example, each processing section may be configured by a logic circuit that achieves the above-described processing. Furthermore, each processing section may include, for example, a CPU, a ROM, a RAM, and the like, and execute a program using them, to thereby implement the above-described processing. Of course, each processing section may have both the configurations, and a part of the above-described processing may be implemented by a logic circuit and the other may be implemented by executing a program. The configurations of the processing sections may be independent from each other, and for example, a part of the processing sections may implement a part of the above-described processing by a logic circuit, another part of the processing sections may implement the above-described processing by executing a program, and still another of the processing sections may implement the above-described processing by both the logic circuit and the execution of the program.

<Flow of Distance Measurement Processing>

Figure 29:
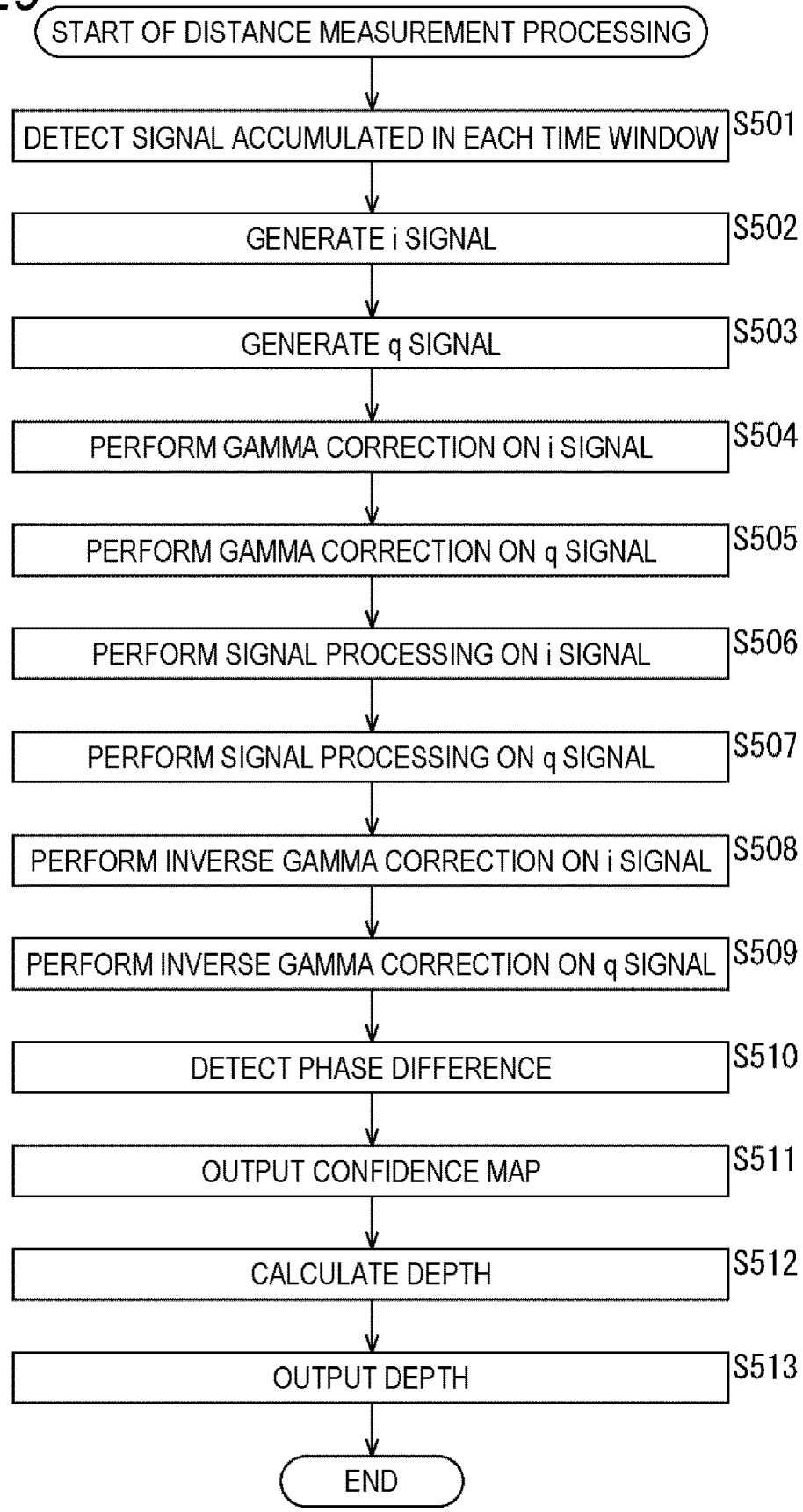
FIG. 29 is a flowchart depicting an example of a flow of the distance measurement processing.

An example of a flow of distance measurement processing executed by the distance measuring device 500 will be described with reference to a flowchart of FIG. 29.

When the distance measurement processing is started, each process of steps S501 to S503 is executed similarly to each process of steps S101 to S103 of FIG. 12.

In step S504, the sensing gamma correcting section 501 performs the gamma correction on the i signal. Furthermore, in step S505, the sensing gamma correcting section 503 performs the gamma correction on the q signal.

In step S506, the signal processing section 103 performs the signal processing on the i signal. Furthermore, in step S507, the signal processing section 108 performs the signal processing on the q signal.

In step S508, the sensing inverse gamma correcting section 502 performs the inverse gamma correction on the i signal. Furthermore, in step S509, the sensing inverse gamma correcting section 504 performs the inverse gamma correction on the q signal.

Respective processes of steps S510 to S513 are executed similarly to respective processes of steps S106 to S109 of FIG. 12.

When the process in step S513 ends, the distance measurement processing ends.

By executing each processing as described above, the distance measuring device 500 can suppress an increase in calculation cost and mounting cost related to signal processing. That is, it is possible to suppress an increase in the load of processing of the sensing data.

6. Computer

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

Figure 30:
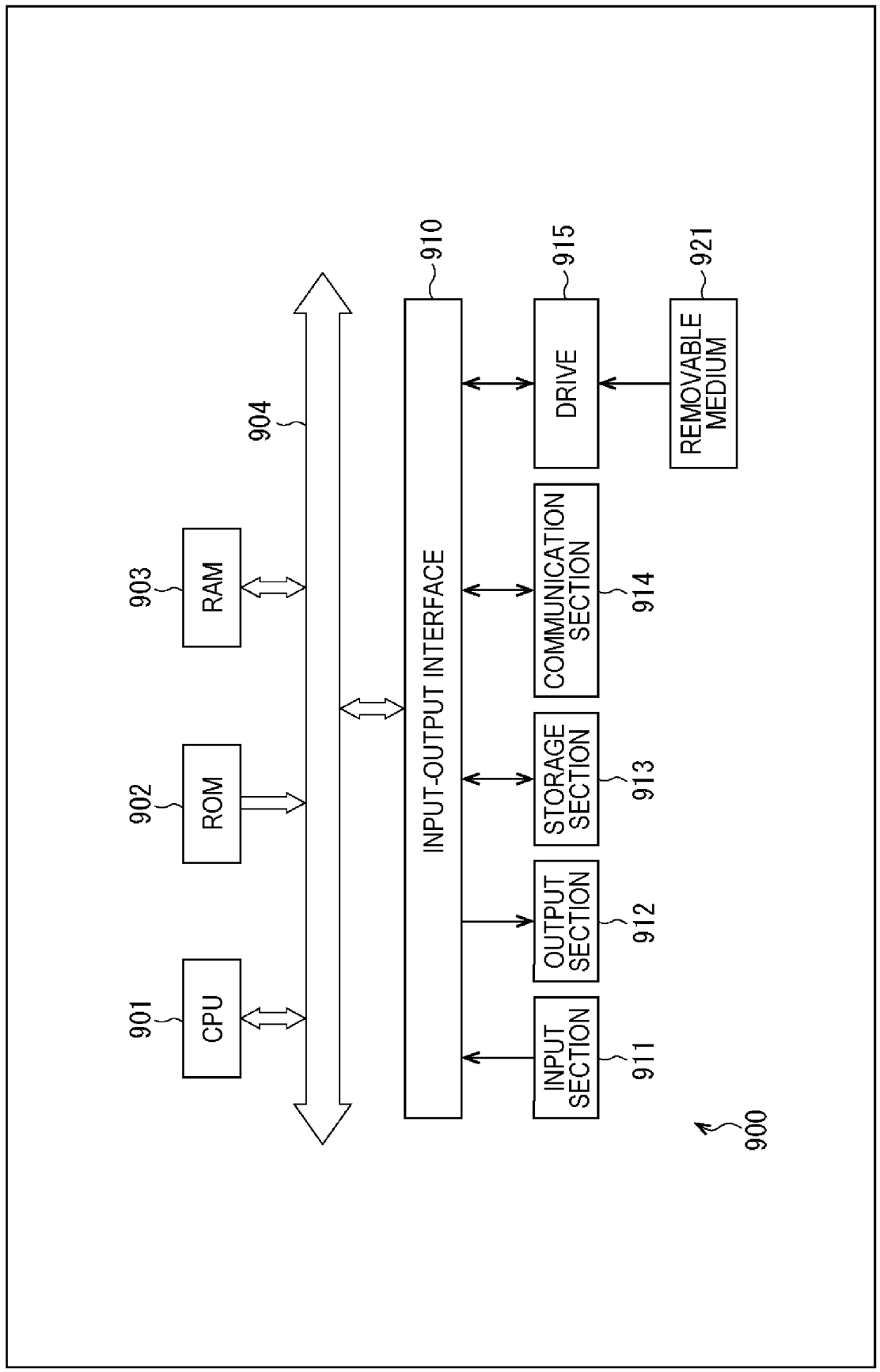
FIG. 30 is a block diagram depicting a main configuration example of a computer.

FIG. 30 is a block diagram depicting a configuration example of hardware of a computer that executes the above-described series of processes by a program.

In a computer 900 depicted in FIG. 30, a central processing unit (CPU) 901, a read only memory (ROM) 902, and a random access memory (RAM) 903 are interconnected via a bus 904.

An input-output interface 910 is also connected to the bus 904. An input section 911, an output section 912, a storage section 913, a communication section 914, and a drive 915 are connected to the input-output interface 910.

The input section 911 includes, for example, a keyboard, a mouse, a microphone, a touch panel, an input terminal, and the like. The output section 912 includes, for example, a display, a speaker, an output terminal, and the like. The storage section 913 includes, for example, a hard disk, a RAM disk, a nonvolatile memory, and the like. The communication section 914 includes, for example, a network interface. The drive 915 drives a removable medium 921 such as a magnetic disk, an optical disk, a magneto-optical disk, or a semiconductor memory.

In the computer configured as described above, the CPU 901 loads, for example, a program stored in the storage section 913 into the RAM 903 via the input-output interface 910 and the bus 904 and executes the program, so as to perform the above-described series of processes. The RAM 903 also appropriately stores data and the like necessary for the CPU 901 to execute various processes.

The program executed by the computer can be applied by being recorded in the removable medium 921 as a package medium or the like, for example. In this case, the program can be installed in the storage section 913 via the input-output interface 910 by attaching the removable medium 921 to the drive 915.

Furthermore, this program can be provided via a wired or wireless transmission medium such as a local area network, the Internet, or digital satellite broadcasting. In this case, the program can be received by the communication section 914 and installed in the storage section 913.

In addition, this program can be installed in the ROM 902 or the storage section 913 in advance.

7. Application Example to Mobile Body

The technology according to the present disclosure (the present technology) can be applied to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a ship, a robot, and the like.

Figure 31:
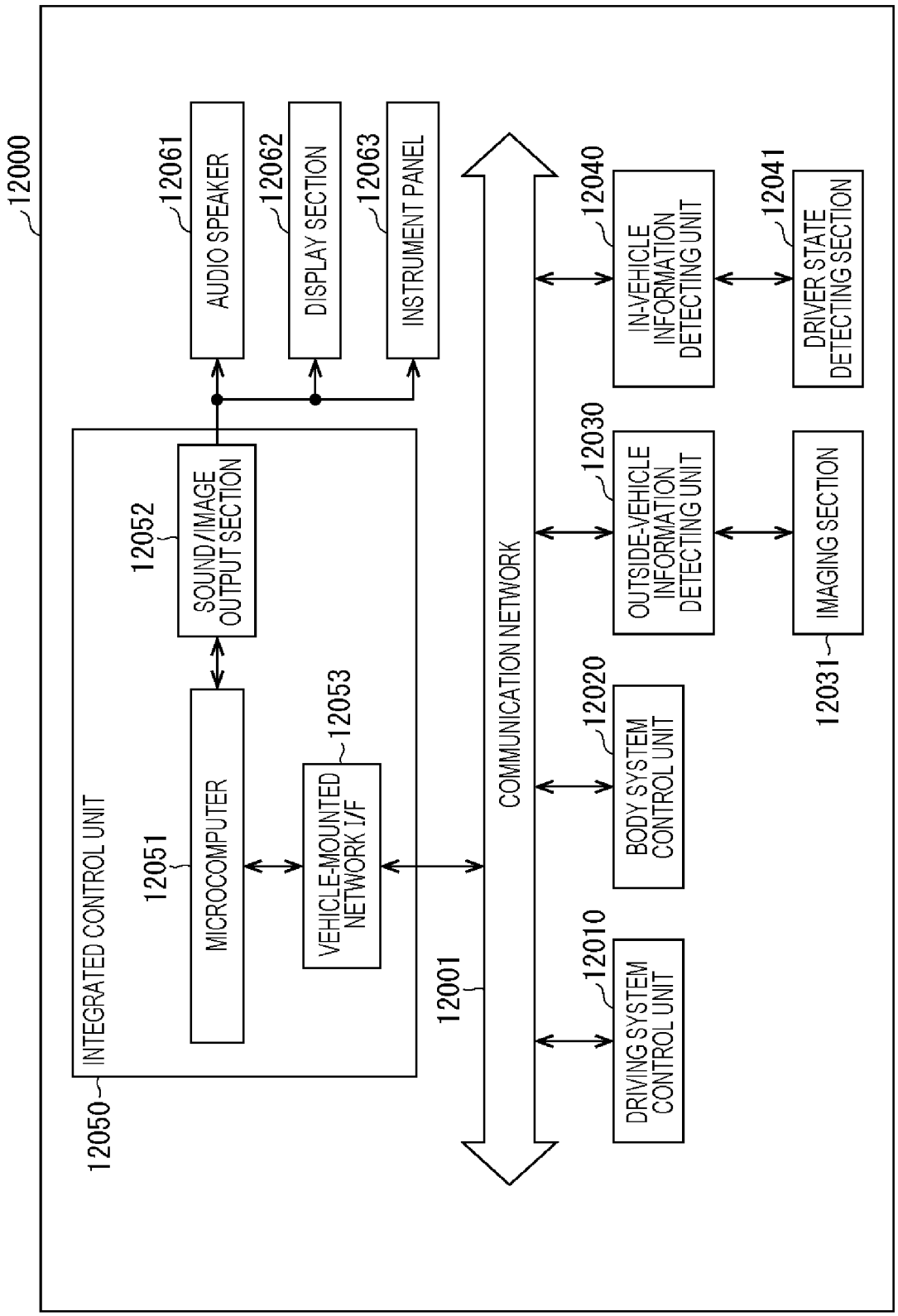
FIG. 31 is a block diagram depicting an example of a schematic configuration of a vehicle control system.

FIG. 31 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 31, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 31, an audio speaker 12061, a display section 12062, and an instrument panel 12063 are illustrated as the output device. The display section 12062 may, for example, include at least one of an on-board display and a head-up display.

Figure 32:
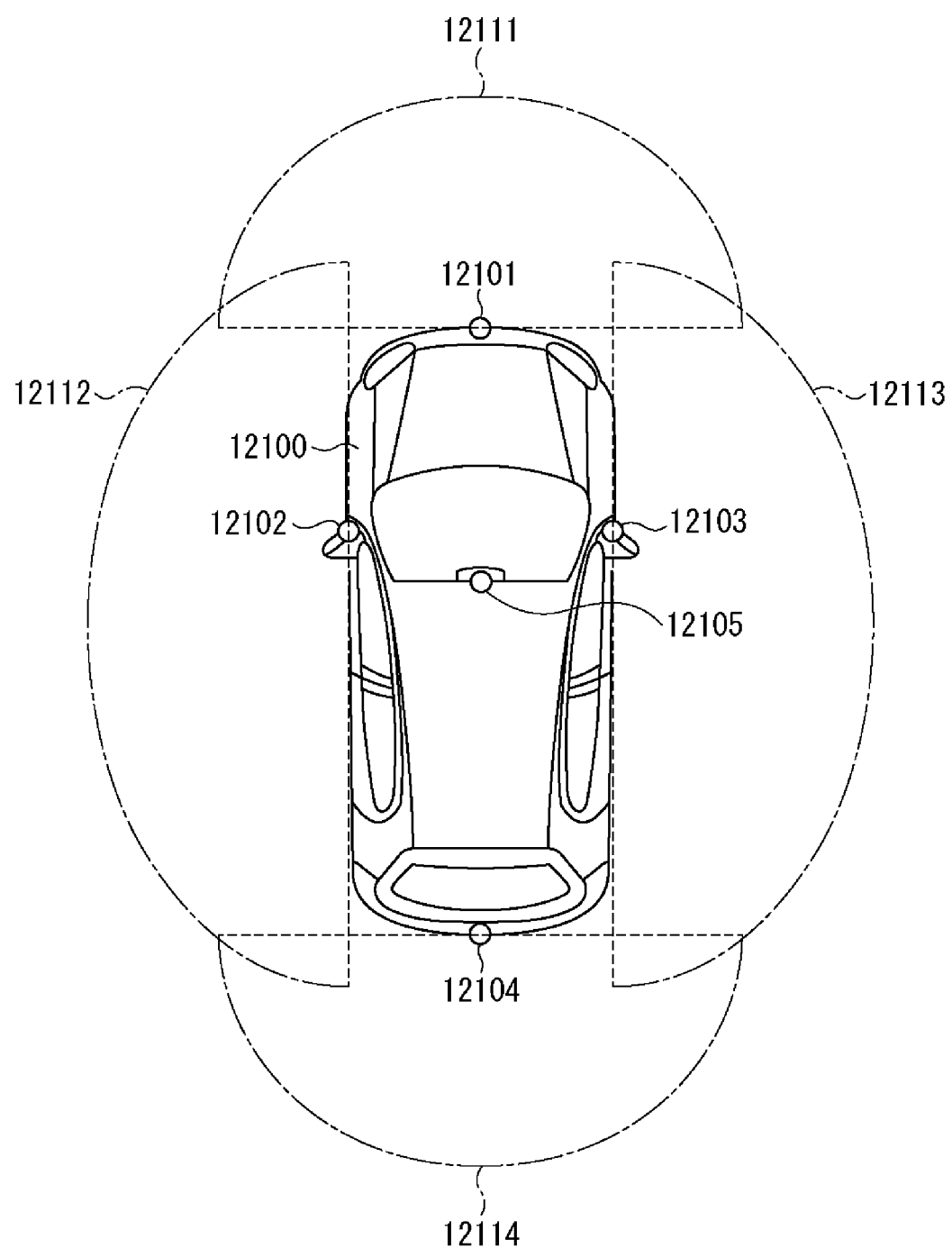
FIG. 32 is a diagram of assistance in explaining an example of installation positions of an outside-vehicle information detecting section and an imaging section.

FIG. 32 is a diagram depicting an example of the installation position of the imaging section 12031.

In FIG. 32, the vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The forward image obtained by the imaging sections 12101 and 12105 are mainly used for detecting a preceding vehicle, a pedestrian, an obstacle, a traffic light, a traffic sign, a lane, and the like.

Incidentally, FIG. 32 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure can be applied has been described above. The technology according to the present disclosure can be applied to the outside-vehicle information detecting unit 12030 and the in-vehicle information detecting unit 12040 among the above-described configurations. Specifically, by using distance measurement by the distance measuring device 100, the distance measuring device 200, the distance measuring system 400, or the distance measuring device 500 as the outside-vehicle information detecting unit 12030 and the in-vehicle information detecting unit 12040, it is possible to perform processing of recognizing a gesture of the driver, execute various operations (for example, an audio system, a navigation system, and an air conditioning system) according to the gesture, and more accurately detect the state of the driver. In addition, the unevenness of the road surface can be recognized using the distance measurement by the distance measuring system 10 and reflected in the control of the suspension. Moreover, it is possible to suppress an increase in the load of processing of these processes.

8. Application Target of Present Technology

The present technology can be applied to any image encoding and decoding method. That is, as long as it does not contradict the present technology described above, the specifications of various processes related to the image encoding and decoding, such as conversion (inverse conversion), quantization (inverse quantization), encoding (decoding), and prediction are arbitrary, and are not limited to the above-described examples. Furthermore, some of these processes may be omitted as long as they do not contradict the present technology described above.

Furthermore, the present technology can be applied to a multi-view image encoding-decoding system that encodes and decodes a multi-view image including images of a plurality of viewpoints (views). In this case, the present technology is only required to be applied to encoding and decoding of each viewpoint (view).

Furthermore, the present technology can be applied to a hierarchical image encoding (scalable encoding) and decoding system that encodes and decodes a hierarchical image layered (hierarchized) so as to have a scalability function for a predetermined parameter. In this case, the present technology is only required to be applied to encoding and decoding of each hierarchy (layer).

The present technology can be applied to an arbitrary configuration.

For example, the present technology can be applied to various electronic devices such as a transmitter and a receiver (for example, a television receiver and a mobile phone) in satellite broadcasting, cable broadcasting such as cable TV, distribution on the Internet, and distribution to a terminal by cellular communication, or the like, or a device (for example, a hard disk recorder and a camera) that records an image on a medium such as an optical disk, a magnetic disk, and a flash memory, or reproduces an image from the storage medium.

Furthermore, for example, the present technology can also be implemented as a configuration of a part of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that in the present description, the system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are all systems.

<Field and Application to which Present Technology is Applicable>

Note that the system, device, processing section, and the like to which the present technology is applied can be used in any fields, for example, traffic, medical care, crime prevention, agriculture, livestock industry, mining, beauty, factory, household appliance, weather, nature monitoring, and the like. Furthermore, its use is arbitrary.

For example, the present technology can be applied to systems and devices used for providing contents for appreciation and the like. Furthermore, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine or the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife, and the like. Moreover, for example, the present technology can also be applied to systems and devices used for sports.

9. Others

Note that in the present description, the "flag" is information for identifying a plurality of states, and includes not only information used for identifying two states of true (1) or false (0), but also information that can identify three or more states. Therefore, the value that this "flag" can take may be, for example, two values of 1 and 0, or three or more values. That is, the number of bits constituting this "flag" is arbitrary, and may be one bit or a plurality of bits.

Furthermore, identification information (including the flag) is assumed to include not only identification information thereof in a bit stream but also difference information of the identification information with respect to a certain reference information in the bit stream, and thus, in the present description, the "flag" and "identification information" include not only the information thereof but also the difference information with respect to the reference information.

Furthermore, various types of information (metadata and the like) related to the coded data (bit stream) may be transmitted or recorded in any form as long as the information is associated with the coded data. Here, the term "associate" means, for example, that one piece of data can be used (linked) when the other piece of data is processed. That is, the data associated with each other may be combined as one piece of data or may be individual pieces of data. For example, information associated with coded data (image) may be transmitted on a transmission path different from that of the coded data (image). Furthermore, for example, the information associated with the coded data (image) may be recorded in a recording medium (or another recording area of the same recording medium) different from the coded data (image). Note that this "association" may be a part of data instead of the entire data. For example, an image and information corresponding to the image may be associated with each other in an arbitrary unit such as a plurality of frames, one frame, or a part of the frame.

Note that in the present description, terms such as "combine", "multiplex", "add", "integrate", "include", "store", "put in", "plug in", and "insert" mean to combine a plurality of items into one, for example, such as combining coded data and metadata into one piece of data, and mean one method of the above-described "association".

Furthermore, the embodiments of the present technology are not limited to the above-described embodiments, and various modifications are possible without departing from the scope of the present technology.

For example, a configuration described as one device (or processing section) may be divided and configured as a plurality of devices (or processing sections). Conversely, configurations described above as a plurality of devices (or processing sections) may be combined and configured as one device (or processing section). Furthermore, a configuration other than those described above may of course be added to the configuration of each device (or each processing section). Moreover, if the configuration and operation of the entire system are substantially the same, a part of the configuration of a certain device (or processing section) may be included in the configuration of another device (or another processing section).

Furthermore, for example, the above-described program may be executed in any device. In that case, it is sufficient if the device has necessary functions (functional blocks and the like) and can acquire necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can be executed as processes of a plurality of steps. Conversely, a process described as a plurality of steps can be collectively executed as one step.

Furthermore, for example, in the program executed by the computer, processing of steps describing the program may be executed in time series in the order described in the present description, or may be executed in parallel or individually at necessary timing such as when a call is made. That is, as long as no contradiction occurs, the processes in the respective steps may be executed in an order different from the above-described orders. Moreover, the processes in steps for describing this program may be executed in parallel with processes in another program, or may be executed in combination with processes in another program.

Furthermore, for example, a plurality of technologies related to the present technology can be implemented independently as a single body as long as there is no contradiction. Of course, any plurality of the present technologies can also be used and implemented in combination. For example, part or all of the present technologies described in any of the embodiments can be implemented in combination with part or all of the present technologies described in other embodiments. Furthermore, part or all of any of the above-described present technologies can be implemented by using together with another technology that is not described above.

Note that the present technology can have configurations as follows.

(1) An information processing device including:
  a bit depth correcting section that corrects a bit depth of intermediate data generated from sensing data obtained in a sensor of an indirect time-of-flight (TOF) method; and
  an encoding section that encodes the intermediate data with the bit depth corrected and generates coded data.
(2) The information processing device according to (1), in which
  the bit depth correcting section corrects the bit depth of the intermediate data using a gamma curve that is a predetermined curve indicating an input-output characteristic.
(3) The information processing device according to (2), in which
  the bit depth correcting section corrects the bit depth of the intermediate data using a gamma curve designed on the basis of calculation accuracy required in subsequent processing.
(4) The information processing device according to (3), in which
  the bit depth correcting section corrects the bit depth of the intermediate data using a gamma curve derived by integrating an inverse number of a minimum quantization value set to satisfy the calculation accuracy.
(5) The information processing device according to any one of (1) to (4), in which
the bit depth correcting section corrects the bit depth of an i signal and the bit depth of a q signal of the intermediate data independently of each other, and
the encoding section encodes the i signal and the q signal with the bit depths corrected independently of each other, and generates each of coded data of the i signal and coded data of the q signal.
(6) The information processing device according to any one of (1) to (4), in which
the bit depth correcting section corrects the bit depth of the intermediate data of multidimensional vector data including both an i signal and a q signal, and
the encoding section encodes the intermediate data of the multidimensional vector data with the bit depth corrected, and generates the coded data.
(7) The information processing device according to (6), further including
a bit allocation amount determining section that determines a bit amount to be allocated to each of the i signal and the q signal on the basis of a total bit amount, in which
the bit depth correcting section corrects the bit depth of each of the i signal and the q signal on the basis of the bit amount determined.
(8) The information processing device according to (7), further including
a base quantization amount calculating section that calculates a base quantization amount of each of the i signal and the q signal, in which
the bit allocation amount determining section determines the bit amount to be allocated to each of the i signal and the q signal on the basis of the total bit amount and the base quantization amount of each of the i signal and the q signal.
(9) The information processing device according to (8), further including
an allowable error amount calculating section that calculates an allowable error amount of each of the i signal and the q signal, in which
the base quantization amount calculating section calculates the base quantization amount of the i signal on the basis of the allowable error amount of the i signal, and calculates the base quantization amount of the q signal on the basis of the allowable error amount of the q signal.
(10) The information processing device according to any one of (6) to (9), further including
a block dividing section that divides each of the i signal and the q signal into block units, in which
the bit depth correcting section corrects the bit depth of the intermediate data for each of the blocks, and
the encoding section encodes the intermediate data with the bit depth corrected for each of the blocks, and generates the coded data.
(11) The information processing device according to any one of (1) to (10), further including
a storage section that stores the coded data.
(12) The information processing device according to any one of (1) to (11), further including
a signal processing section that performs signal processing that does not need a linearity of data on the intermediate data with the bit depth corrected by the bit depth correcting section.
(13) The information processing device according to any one of (1) to (12), further including
a decoding section that decodes the coded data and generates the intermediate data.
(14) The information processing device according to (13), further including
an inverse bit depth correcting section that inversely corrects a bit depth of the intermediate data generated by the decoding section.
(15) An information processing method including:
correcting a bit depth of intermediate data generated from sensing data obtained in a sensor of an indirect time-of-flight (TOF) method; and
encoding the intermediate data with the corrected bit depth and generating coded data.

REFERENCE SIGNS LIST

100 Distance measuring device
101 Sensor
102 i signal generating section
103 Signal processing section
104 Encoding section
105 Frame memory
106 Decoding section
107 q signal generating section
108 Signal processing section
109 Encoding section
110 Frame memory
111 Decoding section
112 Phase difference detecting section
113 Depth calculating section
114 and 115 Encoding section
131 Sensing gamma correcting section
132 Encoding section
151 Decoding section
152 Sensing inverse gamma correcting section
200 Distance measuring device
201 Encoding section
202 Frame memory
203 Decoding section
204 Encoding section
221 and 222 Block dividing section
223 Joint encoding section
224 Buffer
241 Allowable error amount calculating section
242 Base quantization amount calculating section
243 Allowable error amount calculating section
244 Base quantization amount calculating section
245 Target bit amount determination section
246 iq encoding section
281 Buffer
282 Joint decoding section
283 and 284 Block combination section
400 Distance measuring system
401 Distance measuring device
402 Detecting device
411 Sensor
412 Signal processing section
413 Bit depth correcting section
414 Encoding section
421 Decoding section
422 Detecting section
423 Learning section
500 Distance measuring device
501 Sensing gamma correcting section
502 Sensing inverse gamma correcting section 503 Sensing gamma correcting section
504 Sensing inverse gamma correcting section

The invention claimed is:

1. An information processing device, comprising:
a bit depth correcting section configured to:
acquire intermediate data, wherein
the intermediate data is generated from sensing data obtained in a sensor of an indirect time-of-flight (TOF) method,
the intermediate data comprises an i signal and a q signal,
the i signal is a difference between a third signal accumulated by the sensor in a third time window and a first signal accumulated by the sensor in a first time window, and
the q signal is a difference between a fourth signal accumulated by the sensor in a fourth time window and a second signal accumulated by the sensor in a second time window; and
correct a bit depth of the intermediate data, wherein
the correction of the bit depth of the intermediate data comprises correction of a bit depth of the i signal and correction of a bit depth of the q signal; and
an encoding section configured to:
encode the corrected i signal to generate coded data of the i signal; and
encode the corrected q signal to generate coded data of the q signal.

2. The information processing device according to claim 1, wherein
the bit depth correcting section is further configured to correct the bit depth of the intermediate data using a gamma curve that is a specific curve indicating an input-output characteristic.

3. The information processing device according to claim 2, wherein
the bit depth correcting section is further configured to correct the bit depth of the intermediate data using a gamma curve designed based on calculation accuracy required in a subsequent processing operation.

4. The information processing device according to claim 3, wherein
the bit depth correcting section is further configured to correct the bit depth of the intermediate data using a gamma curve derived by integrating an inverse number of a minimum quantization value set to satisfy the calculation accuracy.

5. The information processing device according to claim 1, wherein
the bit depth correcting section is further configured to correct the bit depth of the intermediate data of multi-dimensional vector data including both the i signal and the q signal, and
the encoding section is further configured to encode the intermediate data of the multidimensional vector data with the corrected bit depth to generate coded data.

6. The information processing device according to claim 5, further comprising
a bit allocation amount determining section configured to determine a bit amount allocated to each of the i signal and the q signal based on a total bit amount, wherein
the bit depth correcting section is configured to correct the bit depth of the i signal and the bit depth of the q signal based on the determined bit amount.

7. The information processing device according to claim 6, further comprising
a base quantization amount calculating section configured to calculate a base quantization amount of each of the i signal and the q signal, wherein
the bit allocation amount determining section is further configured to determine the bit amount to be allocated to each of the i signal and the q signal based on the total bit amount and the base quantization amount of each of the i signal and the q signal.

8. The information processing device according to claim 7, further comprising
an allowable error amount calculating section configured to calculate an allowable error amount of each of the i signal and the q signal, wherein
the base quantization amount calculating section is further configured to:
calculate the base quantization amount of the i signal based on the allowable error amount of the i signal, and
calculate the base quantization amount of the q signal based on the allowable error amount of the q signal.

9. The information processing device according to claim 5, further comprising
a block dividing section configured to divide each of the i signal and the q signal into block units, wherein
the bit depth correcting section is further configured to correct the bit depth of the intermediate data for each of the block units, and
the encoding section configured to encode the intermediate data with the bit depth corrected for each of the block units to generate coded data.

10. The information processing device according to claim 1, further comprising
a storage section configured to store the coded data of the i signal and the coded data of the q signal.

11. The information processing device according to claim 1, further comprising
a signal processing section configured to perform signal processing that does not need a linearity of data on the intermediate data with the corrected bit depth.

12. The information processing device according to claim 1, further comprising
a decoding section configured to decode the coded data of the i signal and the coded data of the q signal to generate the intermediate data.

13. The information processing device according to claim 12, further comprising
an inverse bit depth correcting section configured to inversely correct a bit depth of the intermediate data generated by the decoding section.

14. An information processing method, comprising:
acquiring intermediate data, wherein
the intermediate data is generated from sensing data obtained in a sensor of an indirect time-of-flight (TOF) method,
the intermediate data comprises an i signal and a q signal,
the i signal is a difference between a third signal accumulated by the sensor in a third time window and a first signal accumulated by the sensor in a first time window, and
the q signal is a difference between a fourth signal accumulated by the sensor in a fourth time window and a second signal accumulated by the sensor in a second time window;

correcting a bit depth of the intermediate data, wherein
  the correcting of the bit depth of the intermediate data
    comprises correcting a bit depth of the i signal and
    correcting a bit depth of the q signal;
encoding the corrected i signal to generate coded data of
  the i signal; and
encoding the corrected q signal to generate coded data of
  the q signal.

\* \* \* \* \*